United States Patent
Tang et al.

(10) Patent No.: US 8,032,002 B2
(45) Date of Patent: Oct. 4, 2011

(54) FIBER DISTRIBUTION HUB

(75) Inventors: Mao Nian Tang, Su Qian (CN); Todd Loeffelholz, Minnetonka, MN (US); Hai Bin Lei, Song Jiang District (CN)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/763,936

(22) Filed: Apr. 20, 2010

(65) Prior Publication Data

US 2010/0290753 A1 Nov. 18, 2010

Related U.S. Application Data

(63) Continuation of application No. 12/255,758, filed on Oct. 22, 2008, now Pat. No. 7,720,344.

(60) Provisional application No. 60/999,867, filed on Oct. 22, 2007.

(51) Int. Cl.
*G02B 6/00* (2006.01)
(52) U.S. Cl. ......................... 385/135; 385/134
(58) Field of Classification Search ................... 385/135
See application file for complete search history.

(56) References Cited

U.S. PATENT DOCUMENTS

| | | | |
|---|---|---|---|
| 6,215,938 B1 | 4/2001 | Reitmeier et al. |
| 6,480,660 B1 | 11/2002 | Reitmeier et al. |
| 6,983,095 B2 | 1/2006 | Reagan et al. |
| 7,088,899 B2 | 8/2006 | Reagan et al. |
| 7,103,255 B2 | 9/2006 | Reagan et al. |
| 7,146,089 B2 | 12/2006 | Reagan et al. |
| 7,171,102 B2 | 1/2007 | Reagan et al. |
| 7,198,409 B2 | 4/2007 | Smith et al. |
| 7,200,317 B2 | 4/2007 | Reagan et al. |
| 7,218,827 B2 | 5/2007 | Vongseng et al. |
| 7,233,731 B2 | 6/2007 | Solheid et al. |
| 7,245,809 B1 | 7/2007 | Gniadek et al. |
| 7,277,620 B2 | 10/2007 | Vongseng et al. |
| 7,359,610 B2 | 4/2008 | Vongseng |
| 7,369,741 B2 | 5/2008 | Reagan et al. |
| 7,376,322 B2 | 5/2008 | Zimmel et al. |
| 7,376,323 B2 | 5/2008 | Zimmel |
| 7,400,813 B2 | 7/2008 | Zimmel |
| 7,400,816 B2 | 7/2008 | Reagan et al. |
| 7,407,330 B2 | 8/2008 | Smith et al. |
| 7,416,349 B2 | 8/2008 | Kramer |
| 7,418,181 B2 | 8/2008 | Zimmel et al. |
| 7,421,183 B2 | 9/2008 | Vongseng |
| 7,457,503 B2 | 11/2008 | Solheid et al. |
| 7,471,869 B2 | 12/2008 | Reagan et al. |
| 7,522,805 B2 | 4/2009 | Smith et al. |
| 7,606,459 B2 | 10/2009 | Zimmel et al. |

(Continued)

OTHER PUBLICATIONS

International Search Report and Written Opinion mailed Feb. 11, 2009.

(Continued)

*Primary Examiner* — Ryan Lepisto
(74) *Attorney, Agent, or Firm* — Merchant & Gould P.C.

(57) ABSTRACT

A fiber distribution system includes one or more fiber distribution hubs (FDHs) that provide interface at a splice panel and/or a termination panel between incoming fibers routed from a central office and outgoing fibers routed to network subscribers. Splice trays, termination modules, splitter modules, and storage modules can be incrementally added to the FDH. The termination modules, optical splitters, and storage modules can be provided on a swing frame chassis within the FDH cabinet.

20 Claims, 25 Drawing Sheets

U.S. PATENT DOCUMENTS

| | | | |
|---|---|---|---|
| 7,646,958 B1 | 1/2010 | Reagan et al. | |
| 7,720,344 B2 | 5/2010 | Tang et al. | |
| 2004/0228598 A1 | 11/2004 | Allen et al. | |
| 2005/0129379 A1* | 6/2005 | Reagan et al. | 385/135 |
| 2006/0008231 A1* | 1/2006 | Reagan et al. | 385/135 |
| 2006/0228086 A1 | 10/2006 | Holmberg et al. | |
| 2007/0031100 A1 | 2/2007 | Garcia et al. | |
| 2007/0036507 A1 | 2/2007 | Allen et al. | |
| 2007/0147765 A1* | 6/2007 | Gniadek et al. | 385/135 |
| 2007/0189691 A1* | 8/2007 | Barth et al. | 385/135 |
| 2007/0192817 A1 | 8/2007 | Landry et al. | |
| 2007/0230887 A1* | 10/2007 | Vongseng | 385/134 |
| 2008/0008436 A1 | 1/2008 | Reagan et al. | |
| 2008/0019655 A1 | 1/2008 | Vongseng et al. | |
| 2008/0025684 A1 | 1/2008 | Vongseng et al. | |
| 2008/0079341 A1* | 4/2008 | Anderson et al. | 312/287 |
| 2008/0124039 A1 | 5/2008 | Gniadek et al. | |
| 2008/0219630 A1* | 9/2008 | Kowalczyk et al. | 385/135 |
| 2008/0317425 A1 | 12/2008 | Smith et al. | |
| 2009/0016688 A1 | 1/2009 | Zimmel et al. | |
| 2009/0022468 A1 | 1/2009 | Zimmel | |
| 2009/0022469 A1 | 1/2009 | Zimmel | |
| 2009/0067801 A1 | 3/2009 | Vongseng | |
| 2009/0074372 A1 | 3/2009 | Solheid et al. | |
| 2009/0087157 A1 | 4/2009 | Smith et al. | |
| 2009/0103879 A1 | 4/2009 | Tang et al. | |
| 2009/0110359 A1 | 4/2009 | Smith et al. | |
| 2009/0190896 A1 | 7/2009 | Smith et al. | |
| 2009/0196565 A1 | 8/2009 | Vongseng et al. | |
| 2009/0226143 A1 | 9/2009 | Beck | |
| 2009/0238530 A1 | 9/2009 | Wakileh et al. | |
| 2009/0263096 A1 | 10/2009 | Solheid et al. | |
| 2009/0263097 A1 | 10/2009 | Solheid et al. | |
| 2009/0285540 A1 | 11/2009 | Reagan et al. | |
| 2009/0290843 A1 | 11/2009 | Reagan et al. | |
| 2010/0124392 A1 | 5/2010 | Reagan et al. | |

OTHER PUBLICATIONS

Reagan et al., U.S. Appl. No. 12/685,478, filed Jan. 11, 2010, and titled "Fiber Distribution Hub."

* cited by examiner

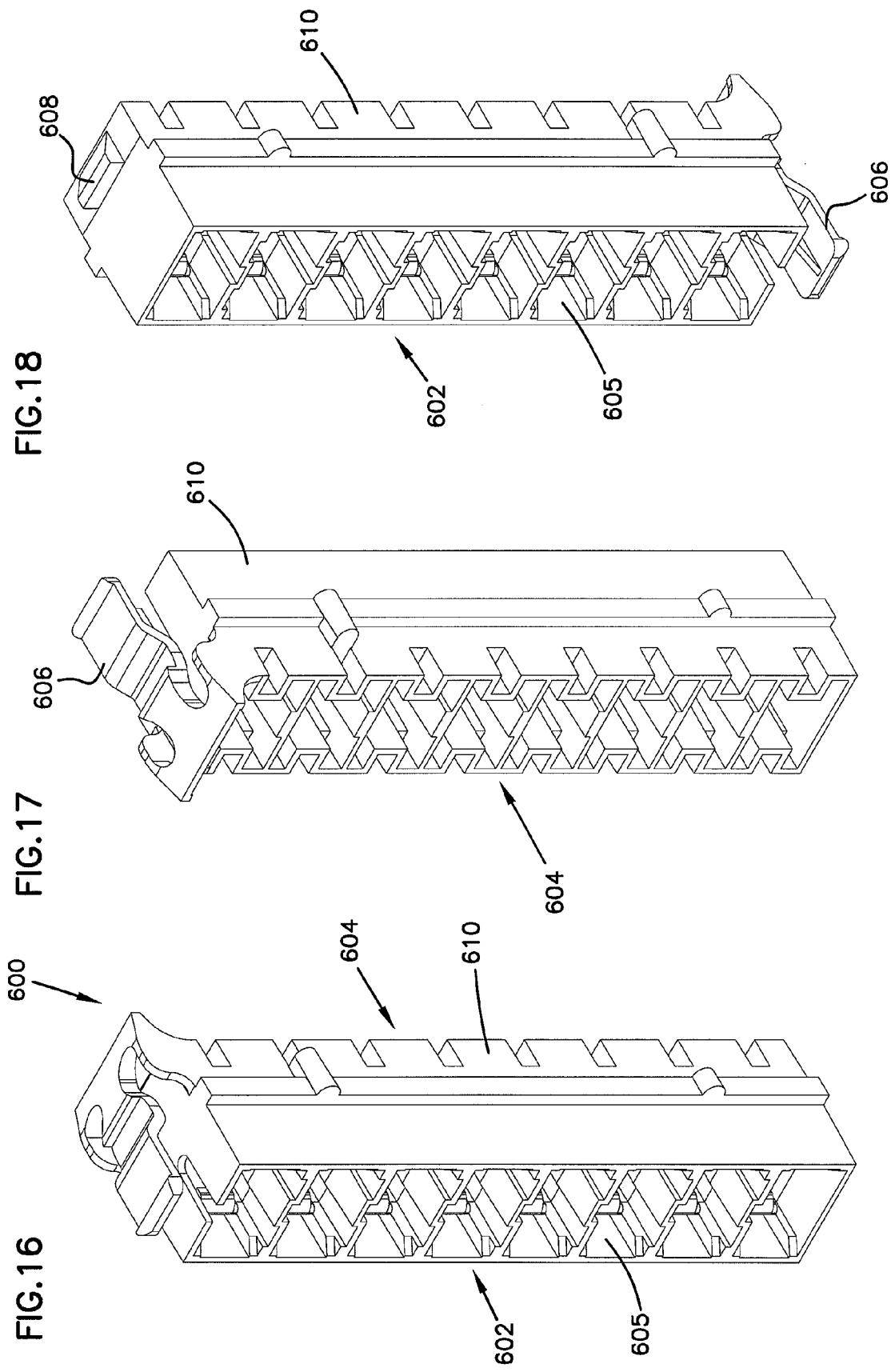

FIG.19
FIG.20
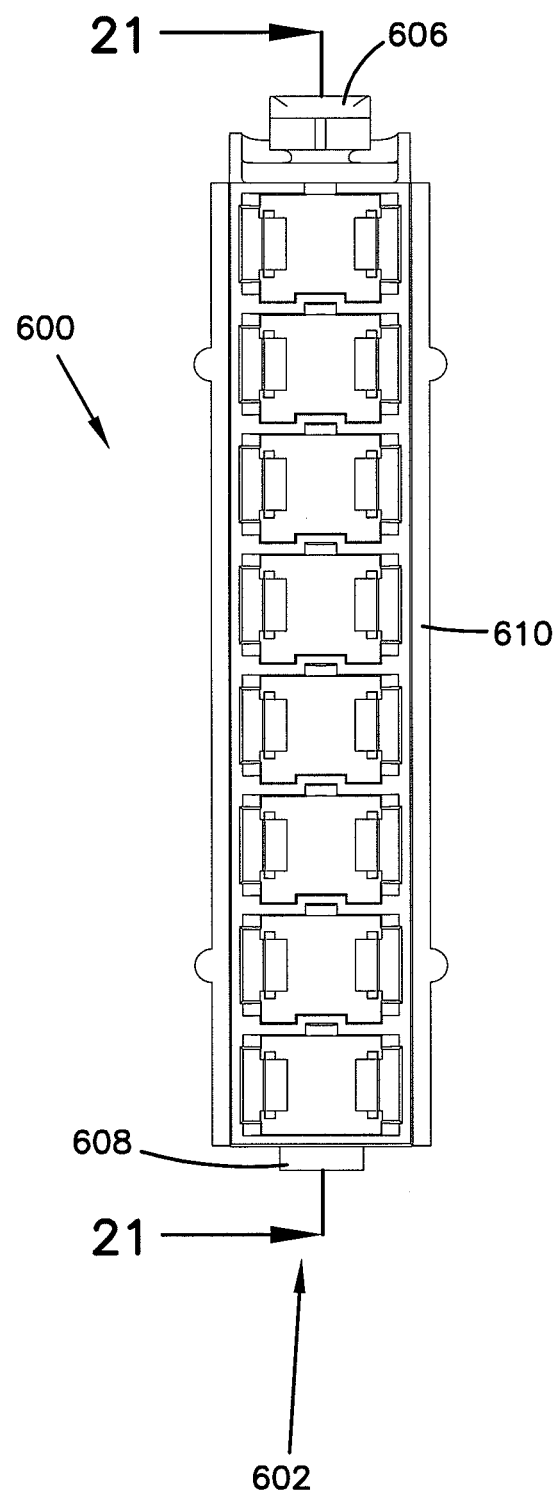
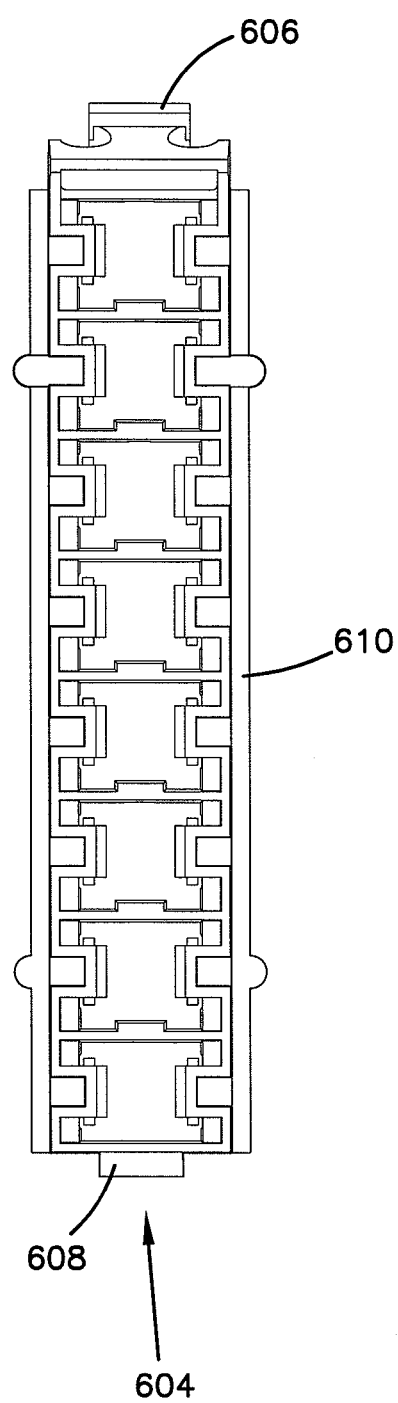

FIBER DISTRIBUTION HUB

CROSS-REFERENCE TO RELATED APPLICATIONS

This application is a continuation of application Ser. No. 12/255,758, filed Oct. 22, 2008, now U.S. Pat. No. 7,720,344, which claims the benefit of provisional application Ser. No. 60/999,867, filed Oct. 22, 2007, which applications are incorporated herein by reference in their entirety.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

FIG. 1 illustrates a network 100 deploying passive fiber optic lines. As shown, the network 100 can include a central office 101 that connects a number of end subscribers 105 (also called end users 105 herein) in a network. The central office 101 can additionally connect to a larger network such as the Internet (not shown) and/or a public switched telephone network (PSTN). The network 100 also can include fiber distribution hubs (FDHs) 103 that may accept a feeder cable F1 having a number of fibers and may split or optically couple those incoming fibers to individual distribution fibers that may be associated with a like number of end user locations 105.

The portion of the network 100 that is closest to the central office 101 is generally referred to as the F1 region, where F1 is the "feeder fiber" from the central office 101. The portion of the network 100 closest to the end users 105 can be referred to as an F2 portion of network 100. The network 100 includes multiple break-out locations 102 at which branch cables are separated out from the main cable lines. Branch cables are often connected to drop terminals 104 that include connector interfaces for facilitating coupling of the fibers of the branch cables to multiple different subscriber locations 105.

In the case of shielded/armored cables, the cables are preferably grounded for safety. In a typical configuration, a grounding plate having grounding pins is provided within the interior of a fiber distribution hub cabinet. The shields of the F1 and F2 cables are electrically connected to the pins of the grounding plate by wires. One of the pins is electrically connected to ground (e.g., a metal rod, post or other member driven into the ground).

SUMMARY

Certain aspects of the disclosure relate to fiber optic cable systems.

In example systems, a fiber distribution system includes one or more fiber distribution hubs (FDHs) that provide an interface between the central office and the subscribers.

Certain aspects of the disclosure relate to cable routing configurations with the FDHs.

Other aspects of the disclosure relate to enhanced access and scalability through the use of modular optical components and grounding kits.

Certain additional aspects of the present disclosure relate to fiber distribution hub configurations that allow a field technician to access optical components stored at different locations within the cabinet.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

FIG. 16 is a front, top, perspective view of an example storage module configured in accordance with the principles of the present disclosure;

FIG. 17 is a rear, top, perspective view of the storage module of FIG. 16 in accordance with the principles of the present disclosure;

FIG. 18 is a front, bottom, perspective view of the storage module of FIG. 16 in accordance with the principles of the present disclosure;

FIG. 19 is a front view of the storage module of FIG. 16 in accordance with the principles of the present disclosure;

FIG. 20 is a rear view of the storage module of FIG. 16 in accordance with the principles of the present disclosure;

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

A fiber distribution hub (FDH) generally administers connections between incoming fiber and outgoing fiber in an Outside Plant (OSP) environment. In general, the FDH includes a termination region at which incoming fibers can communicatively connect to the outgoing fibers. In other embodiments, some incoming fibers can connect directly to the outgoing fibers without passing through the termination region. Embodiments of the FDH also can provide storage regions, splitter regions, and/or splice regions, each of which will be described in greater detail herein.

As the term is used herein, "a connection" between fibers may include direct connections and/or indirect connections. Examples of incoming fibers include feeder cable fibers, which enter the FDH, and intermediate fibers (e.g., connectorized pigtails extending from splitters and patching fibers/jumpers) that connect the feeder cable fibers to the termination region. Examples of outgoing fibers include distribution cable fibers, which exit the FDH, and any intermediate fibers that connect the distribution cable fibers to the termination region.

The FDH provides an interconnect interface for optical transmission signals at a location in the network where operational access and reconfiguration are desired. For example, as noted above, the FDH can be used to split feeder cables and to terminate the split feeder cables to distribution cables routed to subscriber locations. In other embodiments, the FDH can provide a splice interface to couple feeder cables to the distribution cables directly. The FDH also can provide storage of incoming fibers before connection to the outgoing cable fibers.

Figure 1:
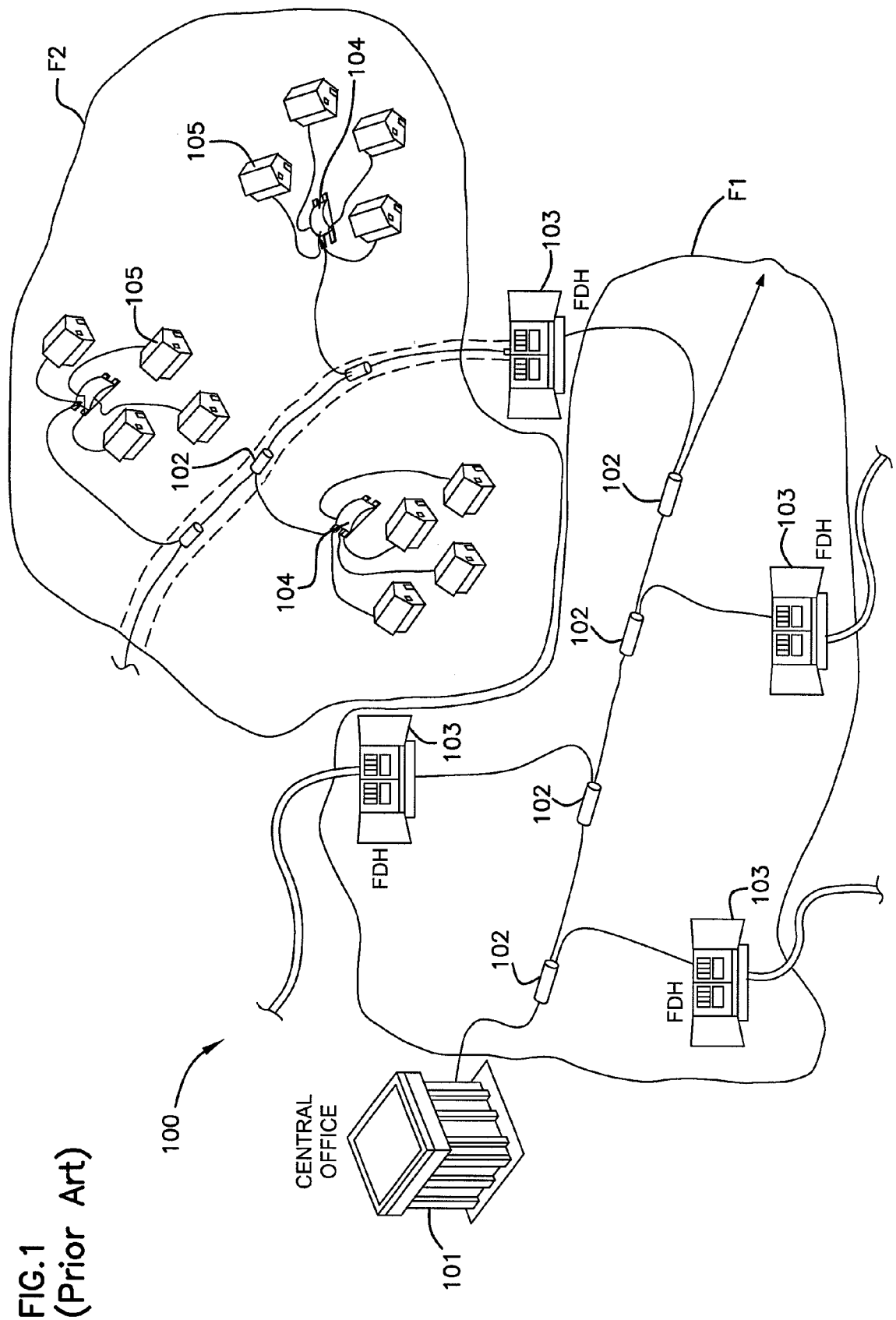
FIG. 1 shows a passive fiber optic network.

An example feeder cable may include twelve to forty-eight individual fibers connected to a service provider central office 101. A typical distribution cable forms the F2 portion of a network (see FIG. 1) and typically includes multiple fibers (e.g., 144, 216 or 432 fibers) that are routed from the FDH to subscriber locations. In addition, the FDH can be designed to accommodate a range of alternative sizes and fiber counts and to support factory installation of pigtails, fanouts, and optical splitters.

Figure 2A:
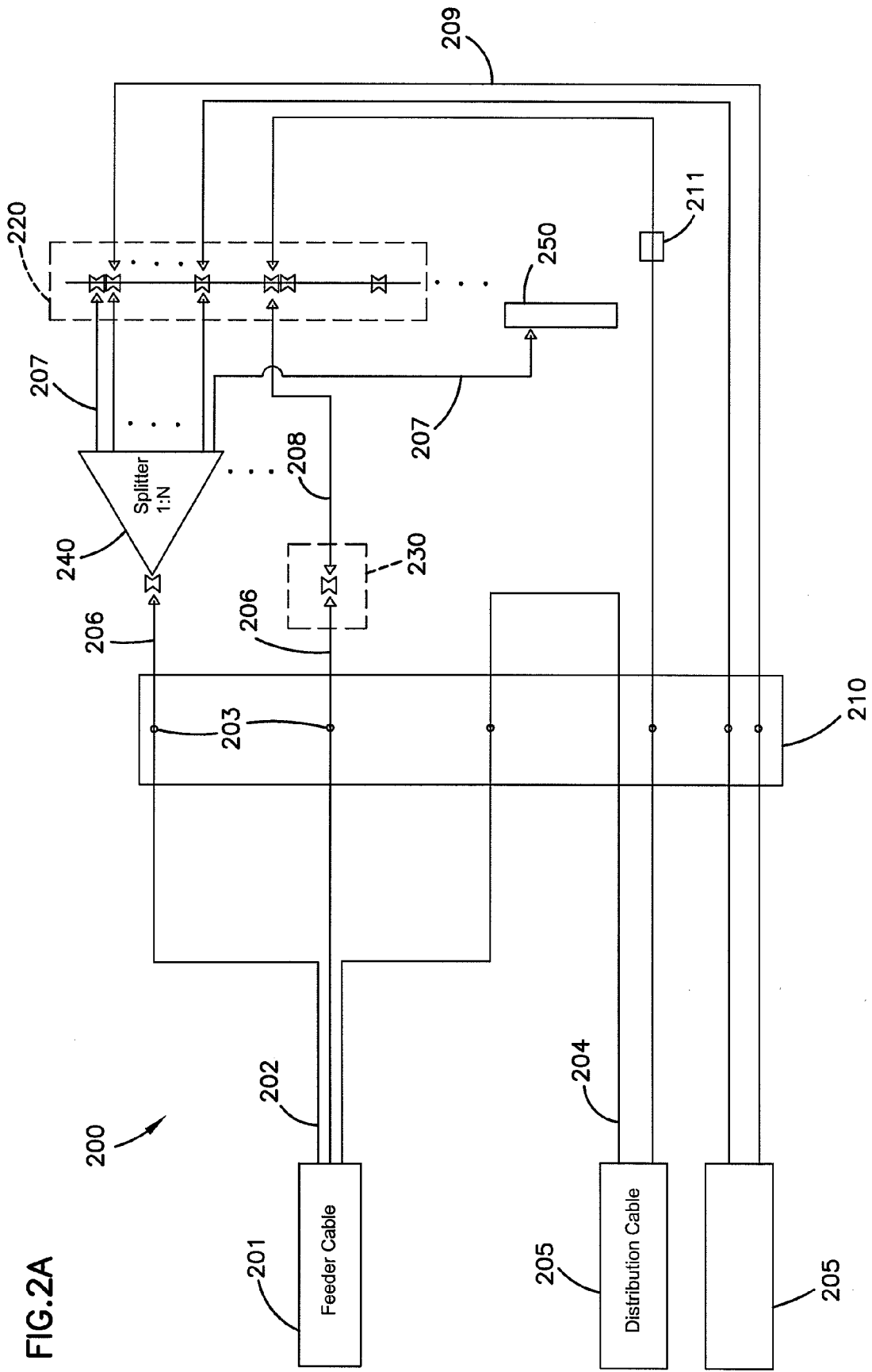
FIG. 2A is a schematic block diagram of an example cable routing scheme for a fiber distribution hub (FDH) having features that are examples of inventive aspects in accordance with the principles of the present disclosure.
Figure 2B:
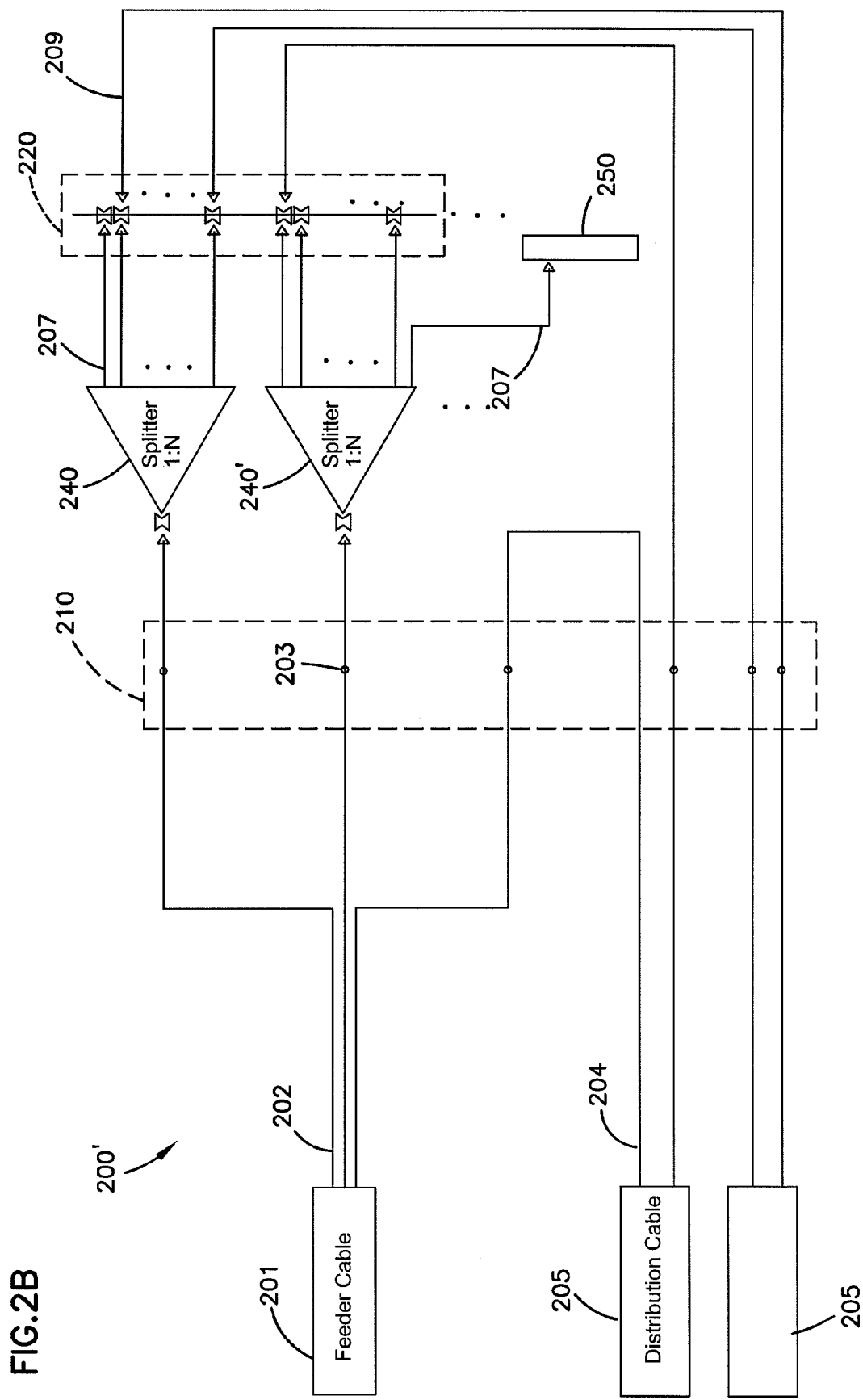
FIG. 2B is a schematic block diagram of another example cable routing scheme for an FDH having features that are examples of inventive aspects in accordance with the principles of the present disclosure.
Figure 4:
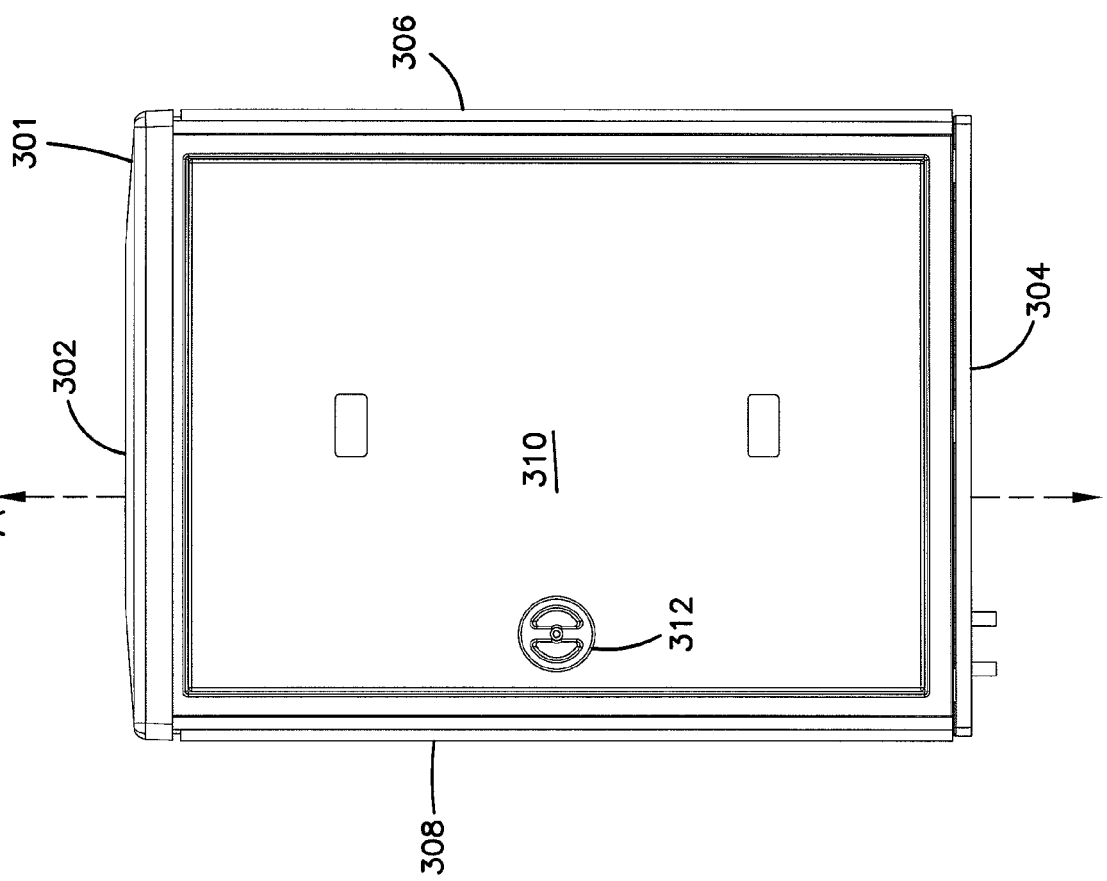
FIG. 4 is a front view of the FDH cabinet of FIG. 3 in accordance with the principles of the present disclosure.
Figure 3:
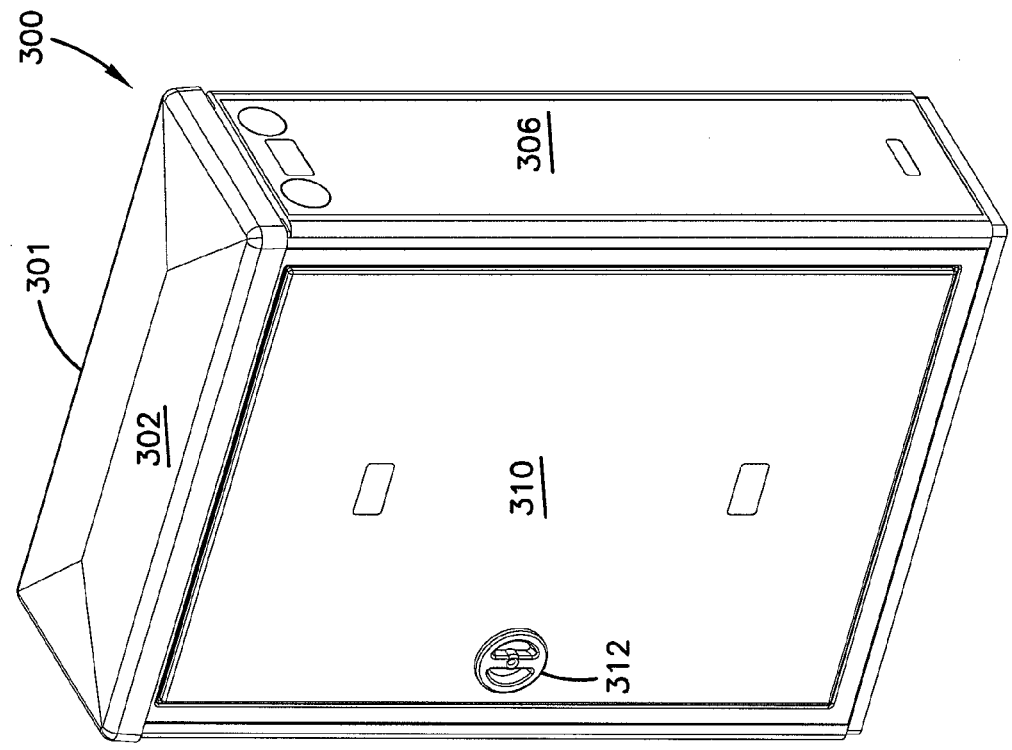
FIG. 3 is a front, perspective view of an FDH cabinet having a closed front door in accordance with the principles of the present disclosure.
Figure 13:
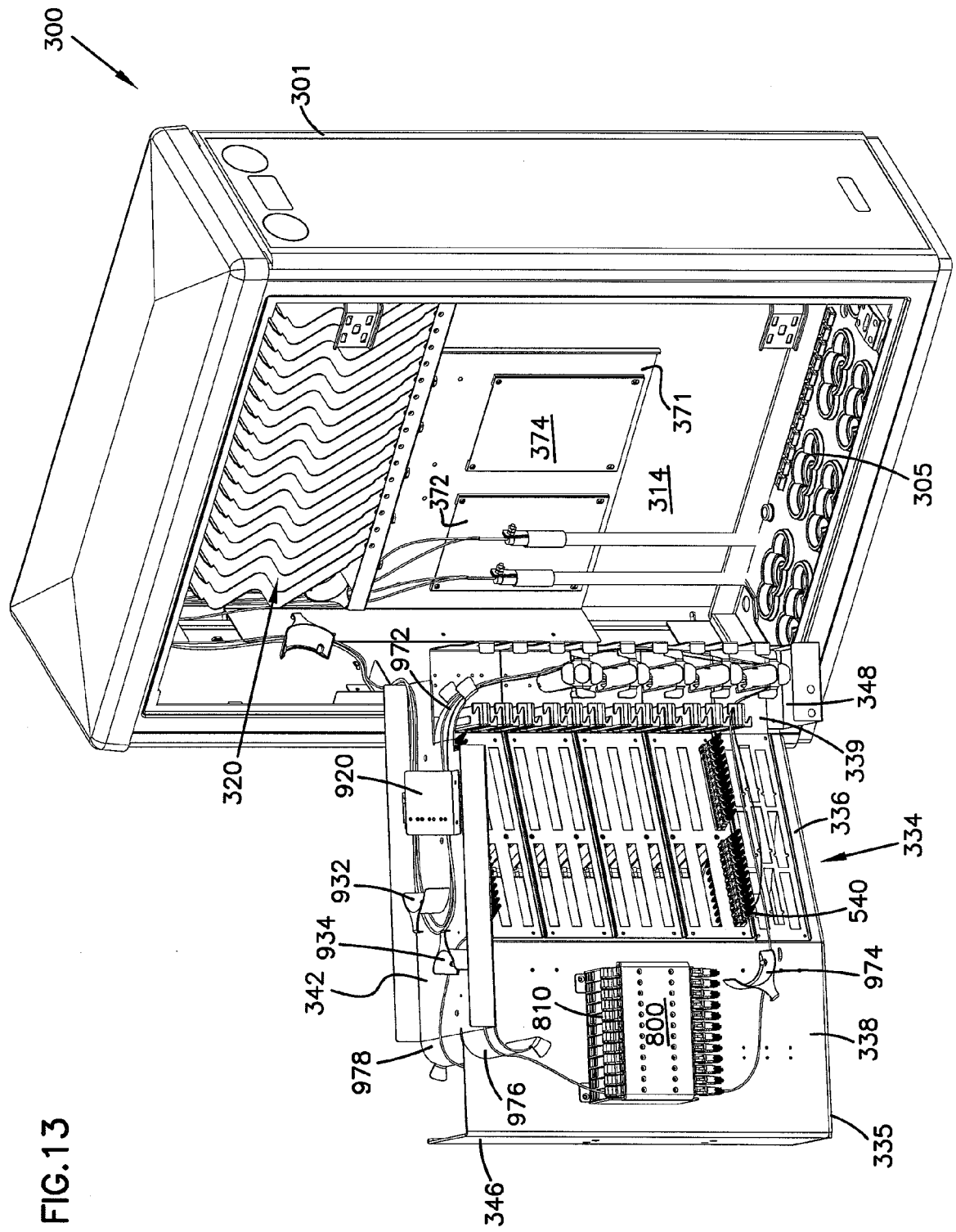
FIG. 13 is a front, perspective view of the FDH cabinet of FIG. 3 when a swing frame is arranged in an open position, thereby facilitating access to a rear interior of the cabinet and a rear of the swing frame in accordance with the principles of the present disclosure.

FIGS. 2A and 2B are schematic diagrams showing example cable routing schemes 200, 200' for embodiments of an FDH 300 (e.g., see FIGS. 3-10). In the cable routing scheme 200 shown in FIG. 2A, a feeder cable 201 and a distribution cable 205 are routed initially into the FDH 300 through a cabinet 301 (e.g., typically through the back or bottom of the cabinet 301 as shown in FIG. 13). In certain embodiments, the fibers 202 of the feeder cable 201 and/or the fibers 204 of the distribution cable 205 may include ribbon fibers.

Figure 11:
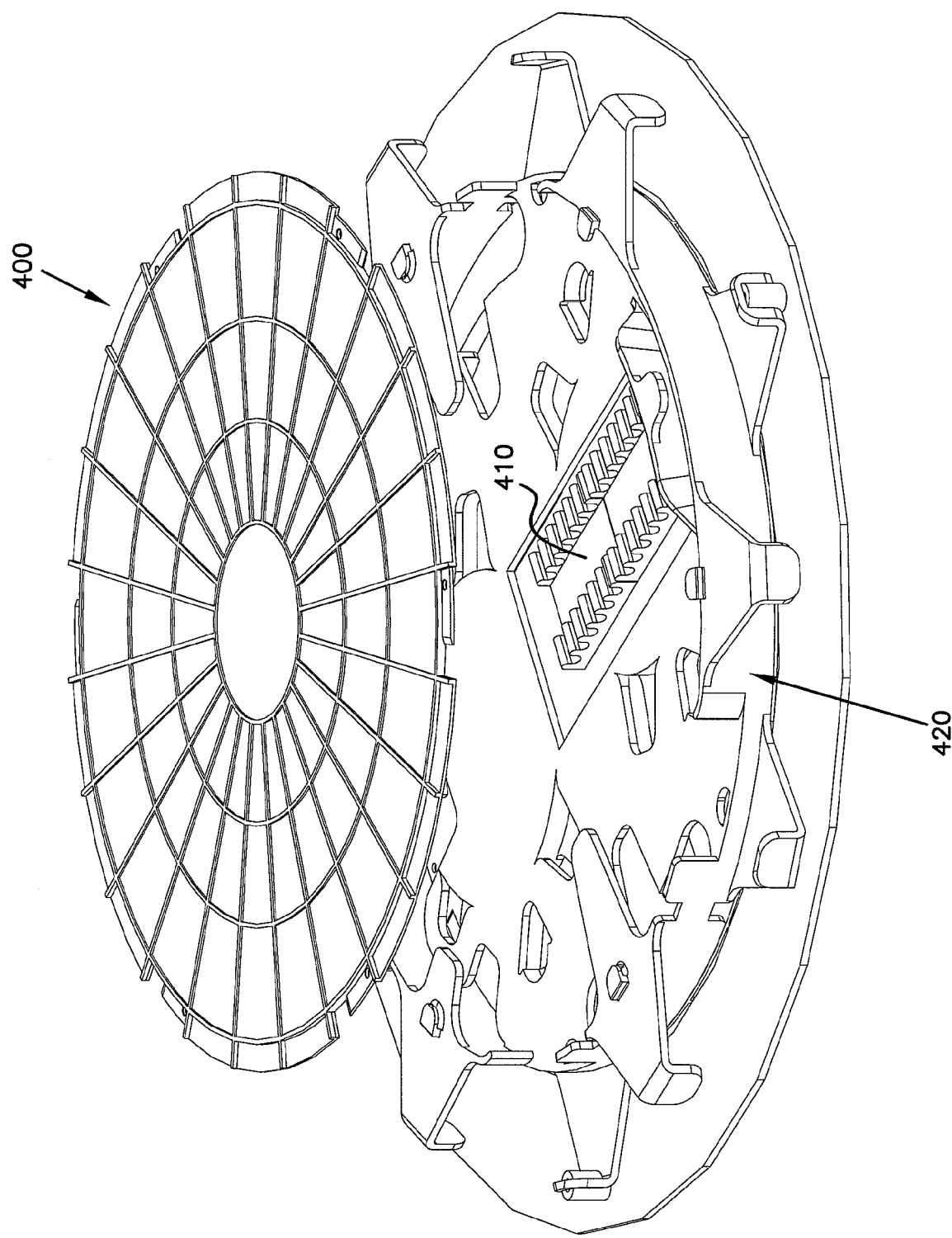
FIG. 11 is an exploded, perspective view of an example splice tray configured in accordance with the principles of the present disclosure.

The fibers 202 of the feeder cable 201 and the fibers 204 of the distribution cable 205 are routed to a splice region 210 of the FDH 300. For example, the fibers 202, 204 may be routed to one or more splice trays, such as splice trays 400, 400' of FIGS. 11-12. At the splice region 210, one or more of the fibers 202 of the feeder cable 201 may be individually connected (at 203) to fibers 204 of the distribution cable 205. Such a direct connection is referred to as a "pass through" splice since the fibers bypass the rest of the FDH 300.

The fibers 204 of the distribution cable 205 that are not spliced to the fibers 202 of the feeder cable 201 are instead spliced to first ends of first pigtails 209. The opposite ends of the first pigtails 209 may be connectorized (i.e., each may be terminated at a fiber optic connector). The connectorized ends of the first pigtails 209 are routed to a termination region 220 to be coupled indirectly to the fibers 202 of the feeder cable 201. For example, the connectorized ends of the first pigtails 209 may be routed to one or more adapters mounted at the termination region 220. In one embodiment, the first pigtails 209 may be routed to a fanout 211 that separates a ribbon cable into individual pigtails 209.

The fibers 202 of the feeder cable 201 that are not spliced directly to the fibers 204 of the distribution cable 205 may be spliced to one or more second pigtails 206. In one embodiment, remote ends of the second pigtails 206 may be connectorized. The connectorized ends of the second pigtails 206 may be routed to a "pass-through" region 230. At the pass-through region 230, the second pigtails 206 may be coupled to patch cords (i.e., or pass-through fibers) 208, which have connectorized ends that may couple to the first pigtails 209 at the termination region 220. The connectorized ends of the pass-through fibers 208 may be stored at a storage region 250 when not in use. Alternatively, the second pigtails 206 may be routed directly to the termination region 220.

In another embodiment, the second pigtails 206 may be routed to a splitter region 240 at which signals carried on the second pigtails 206 are split into multiple signals carried on multiple splitter pigtails 207. For example, at the splitter region 240, the second pigtails 206 may be connected to separate splitter modules, such as splitter modules 810 of FIGS. 22-24, at which the second pigtails 206 are each split into multiple splitter pigtails 207. In one embodiment, each splitter pigtail 207 has a connectorized end.

When the splitter pigtails 207 are not in service, the connectorized ends of the splitter pigtails 207 may be temporarily stored at the storage region 250. When the splitter pigtails 207 are needed for service, the splitter pigtails 207 are routed from the storage region 250 to the termination region 220. At the termination region 220, the splitter pigtails 207 may be connected to the fibers 204 of a distribution cable 205 (e.g., via fiber optic adapters). Accordingly, the termination region 220 can serve as the dividing line between the incoming fibers and the outgoing fibers. Alternatively, the splice region 210 can serve as the dividing line when incoming fibers are spliced directly to outgoing fibers.

In the cable routing scheme 200' shown in FIG. 2B, a second splitter module 240' is provided at the splitter region. In one embodiment, the second splitter module 240' is added to the FDH subsequent to installation of the FDH to facilitate modular scaling of the FDH. One or more of the splitter pigtails 207 of the second splitter module 240' may be routed initially to the storage region 250 before being connected to the distribution cable 205 via the termination region 220. While a pass-through region 230 is not shown in FIG. 2B, the addition of the second splitter 240' does not preclude such a pass-through region 230. In one embodiment, a pass-through region is located adjacent the splitter region 240.

Figure 5:
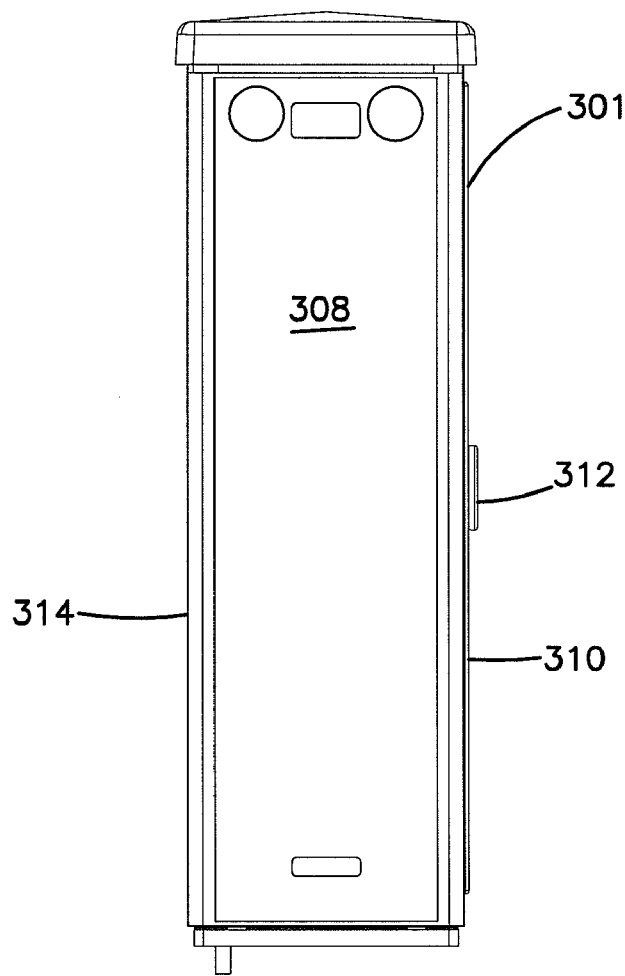
FIG. 5 is a side view of the FDH cabinet of FIG. 3 in accordance with the principles of the present disclosure.
Figure 6:
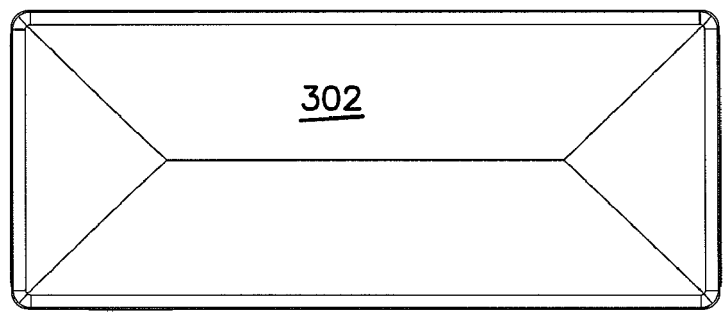
FIG. 6 is a plan view of the FDH cabinet of FIG. 3 in accordance with the principles of the present disclosure.

Referring now to FIGS. 3-6, an example fiber distribution hub (FDH) 300 is shown having features that are examples of inventive aspects in accordance with the principles of the present disclosure. The FDH 300 includes a cabinet 301 that houses internal components. The cabinet 301 of the FDH 300 includes a top panel 302, a bottom panel 304, a right side panel 306, a left side panel 308, and a back panel 314 (FIG. 5).

The cabinet 301 defines openings 305 (e.g., through the bottom panel 304 and/or back panel 314) through which a feeder cable 201 and a distribution cable 205 may enter and exit the cabinet 301 (e.g., see FIG. 13). In one embodiment, a row of openings 305 is provided in the bottom panel 304 of the cabinet 301. In another embodiment, multiple rows of openings are provided. In one embodiment, each opening 305 is configured to receive a single fiber cable (e.g., feeder cable 201 or distribution cable 205). In another embodiment, each opening 305 is configured to receive multiple fiber cables. Typically, a grommet or other seal is provided at each opening 305.

In general, the cabinet 301 defines an access opening covered by at least one door 310 having a handle 312. The at least one door 310 is pivotally mounted to the cabinet 301 (e.g., using hinges) to facilitate access through the access opening to the components mounted within the cabinet 301. In some embodiments, the at least one door 310 includes a right door and a left door (not shown) pivotally mounted to either side of the cabinet 301. In one embodiment, the door 310 includes a lock (not shown).

In general, the cabinet 301 of the FDH 300 is configured to protect the internal components against rain, wind, dust, rodents, and other contaminants. However, the cabinet 301 remains relatively lightweight for easy installation, and breathable to prevent accumulation of moisture in the unit. In some embodiments, an aluminum construction with a heavy powder coat finish also provides for corrosion resistance. In one example embodiment, the cabinet 301 is manufactured from heavy gauge aluminum and is NEMA-4X rated. In other embodiments, however, other materials also can be used.

In accordance with example embodiments, the FDH 300 is provided in pole mount or pedestal mount configurations. For example, loops (not shown) may be provided on the cabinet 301 for facilitating deployment of the cabinet 301 at a desired location. The loops may be used to position the cabinet 301 using a crane. In particular, the crane can lower the cabinet 301 into an underground region. In some embodiments, the loops are removable or can be adjusted to not protrude from the top cabinet panel 302.

In general, the internal components of the cabinet 301 are arranged in one of three general areas: (1) a splice region 320; (2) a swing frame region 330; and (3) a grounding region 370. In the examples shown in FIGS. 7-8, the splice region 320 is arranged at the top, front of the cabinet 301 (e.g., see FIG. 7), the swing frame 330 is arranged at the bottom, front of the cabinet 301 (e.g., see FIG. 7), and the grounding region 370 is arranged at the back of the cabinet 301 (e.g., see FIG. 8). Such a configuration reduces bending of the fiber cables since the fibers are routed initially to the top of the cabinet 301. In other embodiments, however, these regions 320, 330, 370 may be arranged in any desired configuration.

Referring to FIGS. 9-12, one or more splice trays 400 may be mounted at the splice region 320. For example, each splice tray 400 may be arranged on panels 324 mounted at the splice region 320. In the example shown in FIG. 9, each panel 324 is mounted to a chassis having a bottom surface 322 and/or a side surface 326. In one embodiment, each panel 324 is oriented at an angle with respect to a longitudinal axis A (FIG. 4) of the cabinet 301. In other embodiments, however, the panels 324 may be oriented parallel or perpendicular to the longitudinal axis A of the cabinet 301.

Figure 12:
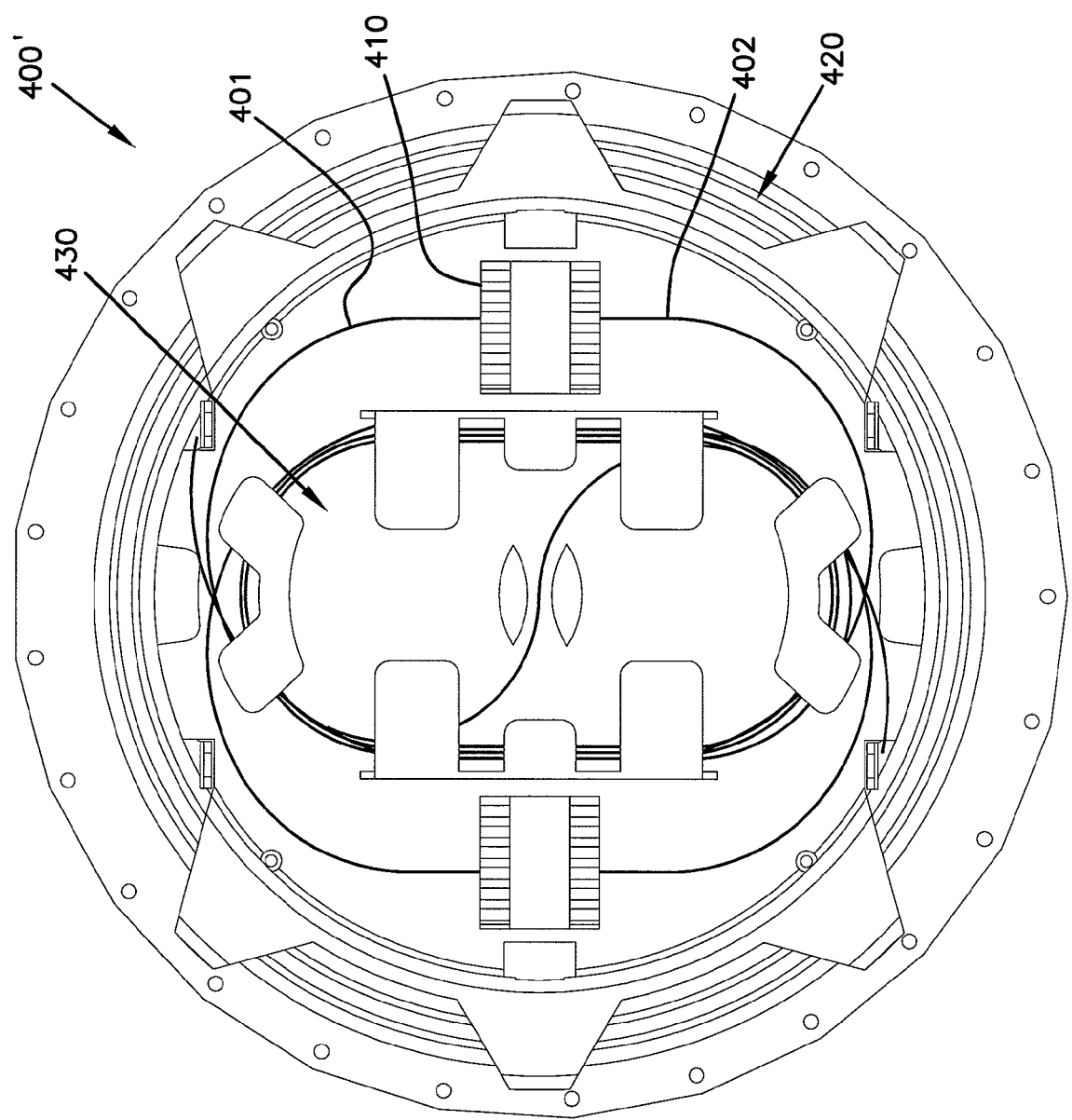
FIG. 12 is a plan view of another example splice tray configured in accordance with the principles of the present disclosure.

Each splice tray is configured to receive at least a first fiber 401 and a second fiber 402 (e.g., see FIG. 12). The splice tray 400 facilitates fusion splicing of the first fiber 401 to the second fiber 402. For example, the splice tray 400 can facilitate splicing a fiber 202 of the feeder cable 201 to a fiber 204 of the distribution cable 205 (see FIG. 2A). In another embodiment, the splice tray 400 can splice a fiber 204 of the distribution cable 205 to a first pigtail 209 (see FIG. 2A). In yet another embodiment, the splice tray 400 can splice a fiber 202 of the feeder cable 201 to a second pigtail 206 (see FIG. 2A).

Excess or slack length of the first and second fibers 401, 402 may be taken up by winding the excess length around and/or within the splice tray. In one embodiment, each splice tray 400 includes at least one coupling region 410 surrounded by a first fiber management region 420 for retaining the excess length (e.g., see FIGS. 11 and 12). A second fiber management region 430 also may be provided at a center of the splice tray (e.g., see splice tray 400' in FIG. 12). The fiber management regions 420, 430 may include fiber managing tools (e.g., spools, tabs, bend radius limiters, etc.) that facilitate routing at least the first and second fibers 401, 402 to the coupling region 410.

More information regarding the splice trays 400, 400' can be found in U.S. Pat. No. 6,215,938, issued Apr. 10, 2001, and entitled "FIBER OPTIC CABINET AND TRAY," the disclosure of which is hereby incorporated herein by reference.

Figure 14:
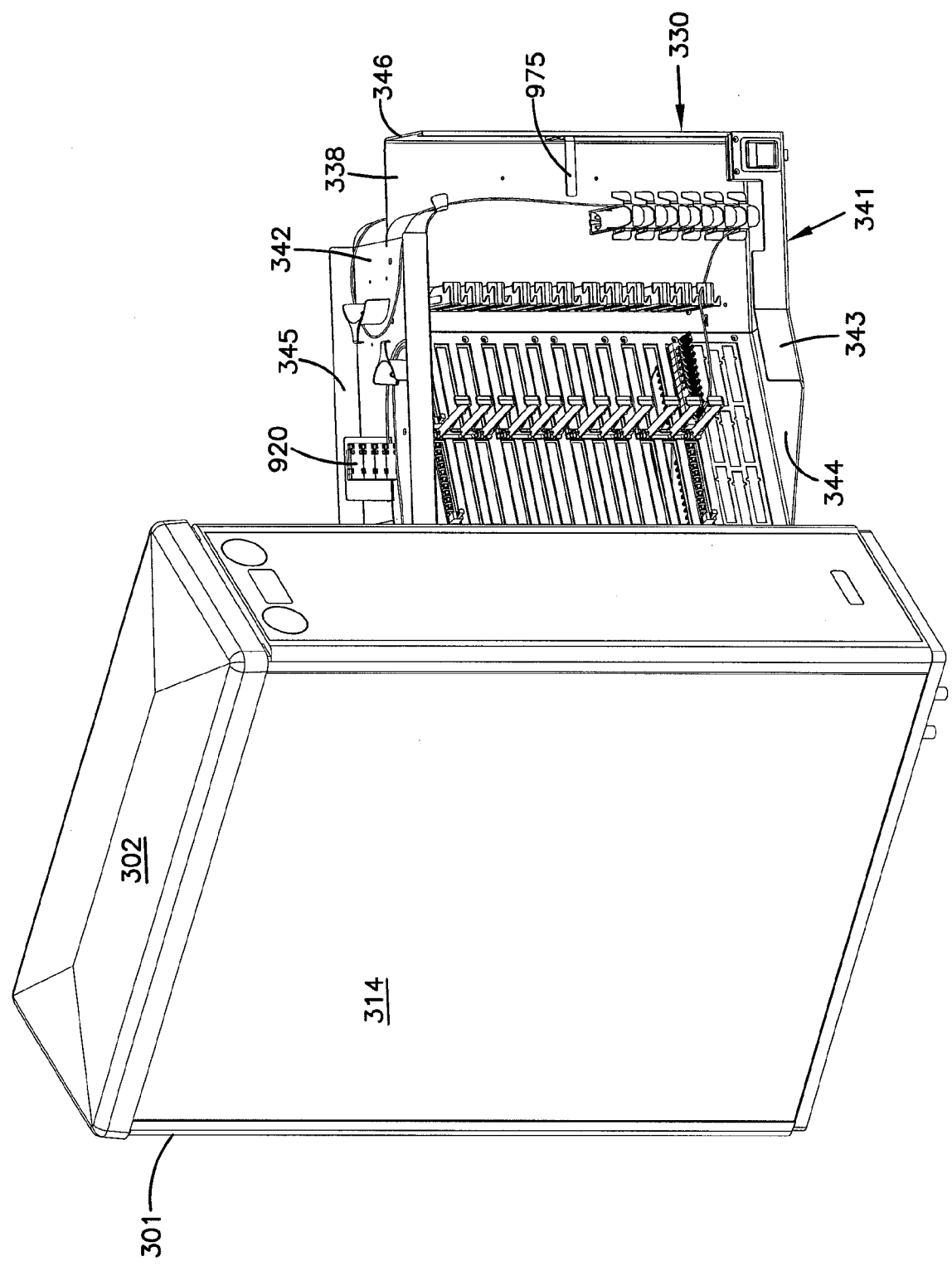
FIG. 14 is a rear, perspective view of the FDH cabinet of FIG. 13 in accordance with the principles of the present disclosure.
Figure 15:
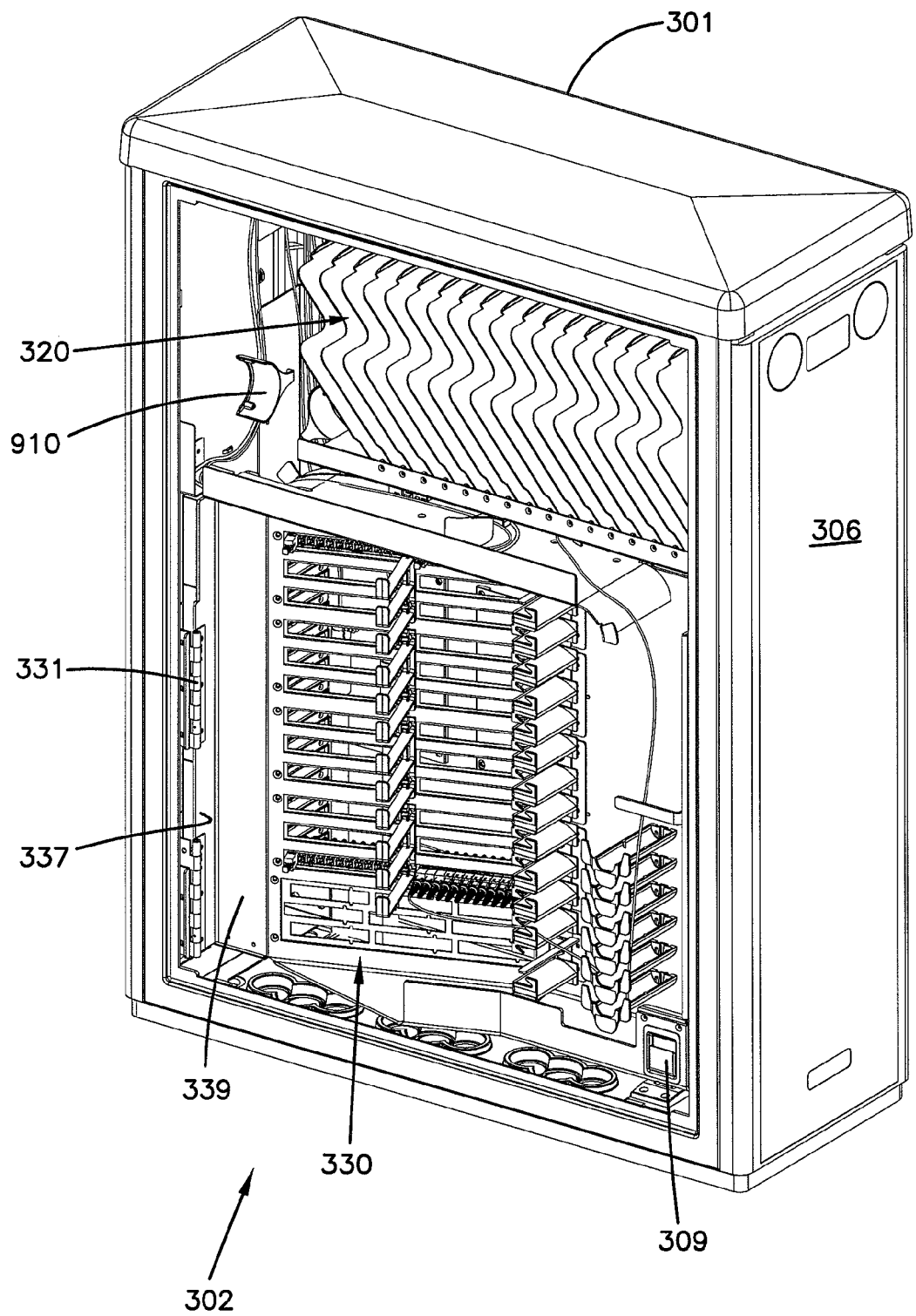
FIG. 15 is a front, perspective view of the FDH cabinet of FIG. 13 when the swing frame is arranged in a closed position in accordance with the principles of the present disclosure.
Figure 21:
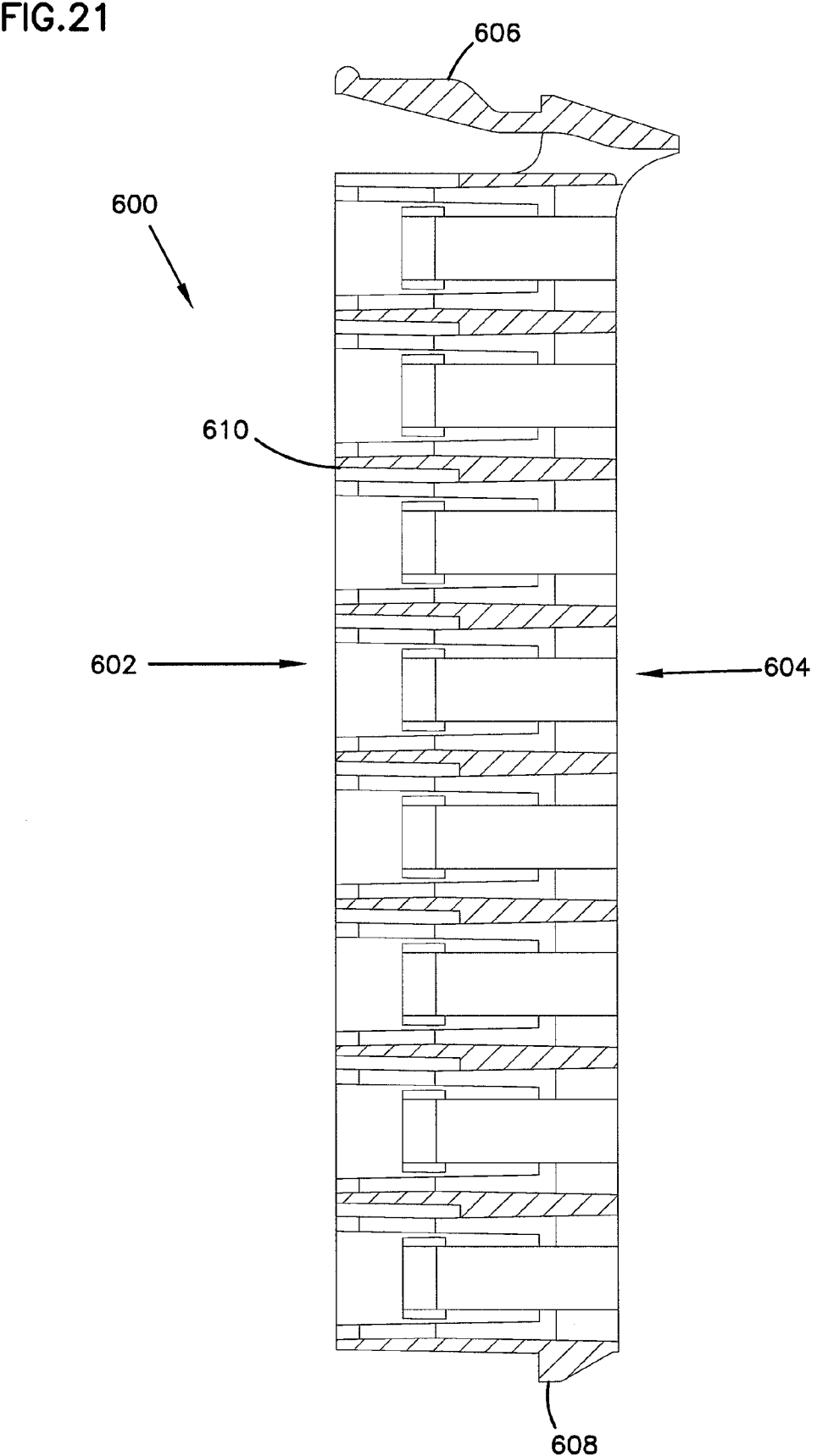
FIG. 21 is a cross-sectional view taken along the line 21-21 in FIG. 19 in accordance with the principles of the present disclosure.

Referring to FIGS. 13-15, the swing frame region 330 of the cabinet 301 includes a bulkhead 335 that holds optical components and is pivotally mounted (e.g., on hinges 331) within the cabinet 301 to facilitate access to the optical components (e.g., located in the rear portion 334 of the swing frame 330) for cleaning, testing, maintenance, additions, etc. For example, in one embodiment, the bulkhead 335 may include a connecting panel 339 that couples to a hinge-mounting strip 337 positioned at a side of the swing frame 330 (e.g., see FIG. 15). The hinge-mounting strip 337 may include one or more hinges 331.

In general, the bulkhead 335 may swing from a first position (e.g., see FIG. 15), in which the bulkhead 335 is arranged fully within the cabinet 301, to a second position (e.g., see FIG. 13), in which at least part of the bulkhead 335 extends outwardly from the cabinet 301. In one embodiment, the bulkhead 335 swings out of the cabinet 301 through the access opening (e.g., see FIG. 13). In the example shown, pivoting the bulkhead 335 out of the cabinet 301 causes a side panel 346 of the bulkhead 335 to move away from an interior volume of the cabinet 301. In one example embodiment, the bulkhead 335 can be pivoted about ninety degrees or more out of the cabinet 301.

In example embodiments, the bulkhead 335 includes a release latch 309 (FIG. 15) that locks the bulkhead 335 in a closed position within the cabinet 301 of the FDH 300 until the latch is actuated. Once the latch 309 is actuated, the bulkhead 335 can be pivoted out of the cabinet 301. In addition, a pivoting locking member (not shown) can be mounted to a rear side 334 of the bulkhead 335 to hold the bulkhead 335 in the open position.

In some embodiments, the hinges 331 of the bulkhead 335 are positioned to pivot about a pivot axis, thereby providing a single point of flex for the fiber cables routed to the bulkhead 335. This pivot axis is constructed to control the fiber bend. In particular, the hinges 331 and cable management devices, which are discussed in greater detail herein, are arranged to ensure that manufacture recommended bend radii of fiber are maintained when the swing frame 330 is opened or closed. In one embodiment, the cabinet 301 can be pre-cabled at a factory, or plant, so as to have cable bundles dressed around the hinges 331. Pre-cabling the cabinet 301 reduces the chance that cabling will be done incorrectly.

Figure 27:
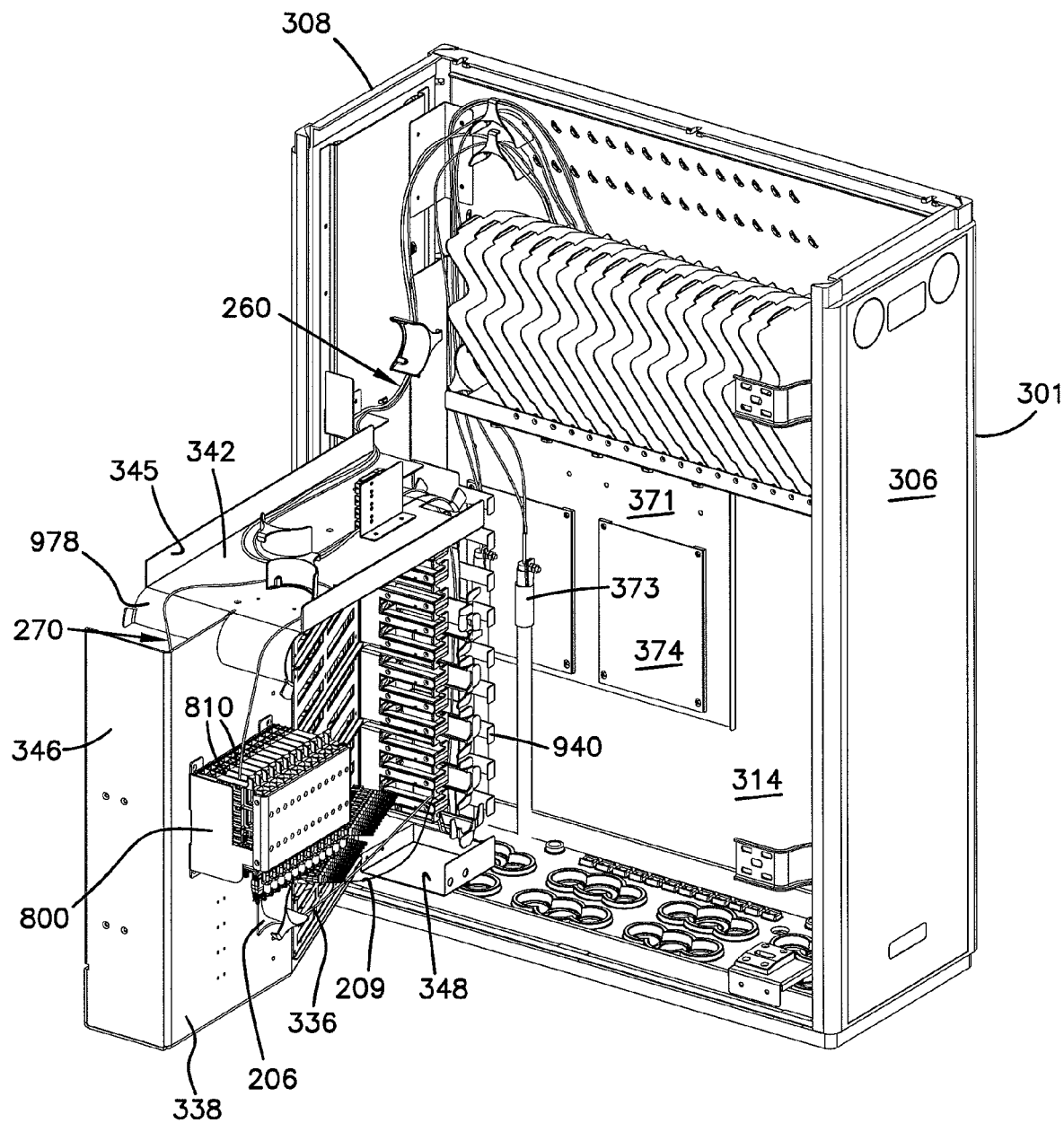
FIG. 27 is a front, perspective view of the FDH cabinet of FIG. 26 in which the swing frame extends about 90 degrees out of the cabinet in accordance with the principles of the present disclosure.

The bulkhead 335 divides the swing frame 330 into a front portion 332 (see FIG. 14) and a back portion 334 (see FIG. 13). The bulkhead 335 generally extends between top and bottom panels 342, 344 (see FIG. 14), and between a side panel 346 and the connecting panel 339 (see FIG. 13). The bulkhead 335 may include one or more panels defining a termination region 350 (e.g., see FIG. 7), a storage region 360 (e.g., see FIG. 7), and a splitter region 380 (e.g., see FIG. 8). In the example shown, the bulkhead 335 includes a first panel 336 defining the termination region 350 and storage region 360 (see FIG. 7). A back 334 of a second panel 338 defines the splitter region 380 (see FIG. 8) and the front 332 of the second panel 338 is configured for cable management (see FIG. 7). In one embodiment, the panels 336, 338 are angled relative to one another (e.g., see FIG. 27).

Generally, at least one termination module 500 (e.g., see FIG. 7) is provided at the termination region 350 and at least one storage module 600 (e.g., see FIGS. 16-21) is provided at the storage region 360. In one embodiment, the termination module 500 and storage module 600 are inserted into openings in the bulkhead 335 from the front 332 and extend through the bulkhead 335 to the rear 334. At least one splitter module housing 800 configured to accommodate one or more splitter modules 810 is positioned at the splitter region 380 on the back 334 of the swing frame bulkhead 335.

Figure 7:
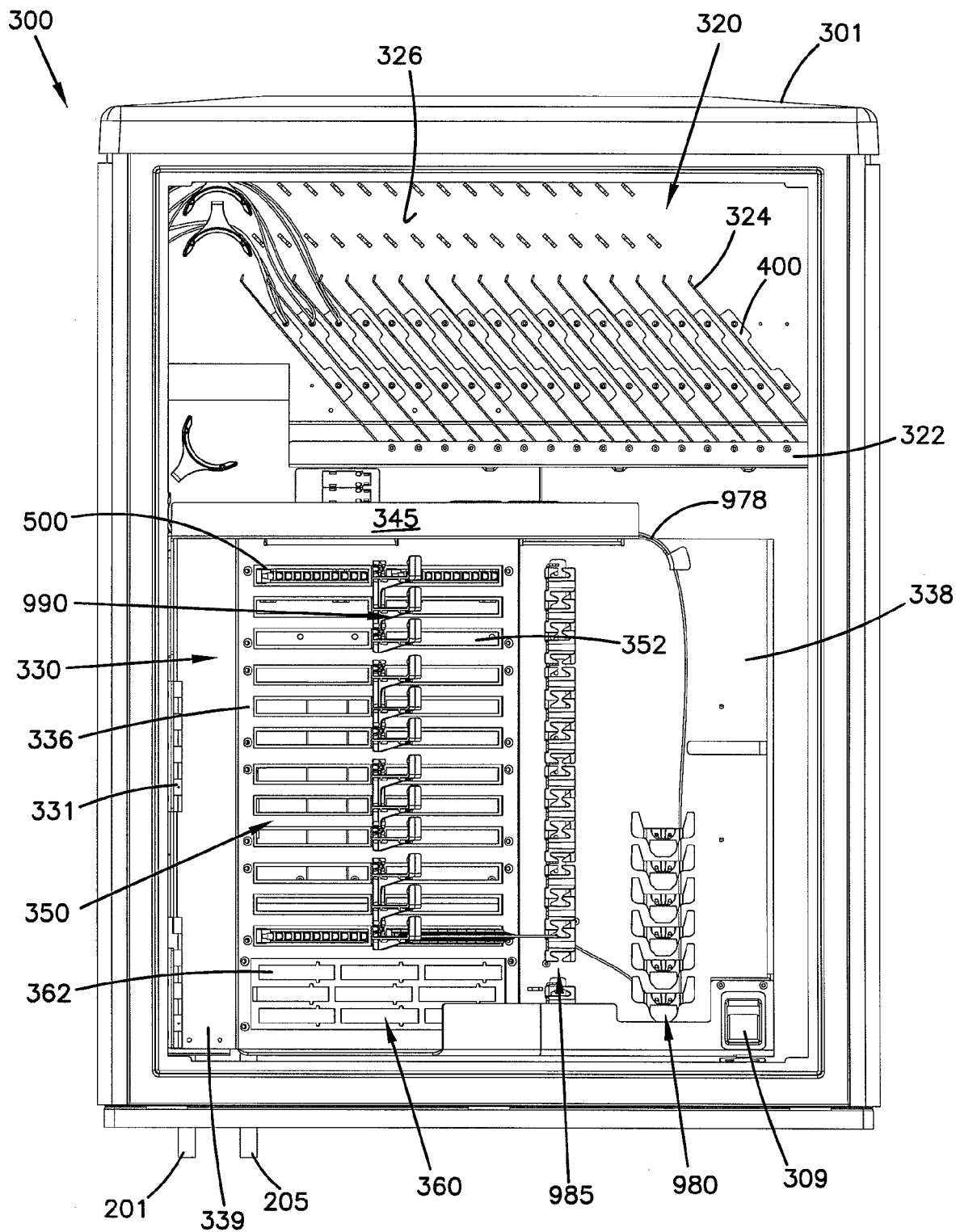
FIG. 7 is a front view of the FDH cabinet of FIG. 3 with the front door removed so that the cabinet interior is visible through an access opening in accordance with the principles of the present disclosure.

As shown in FIG. 7, the termination region 350 defines at least one rectangular opening 352 through which the termination modules 500 extend. In the embodiment shown, the termination region 350 includes two columns of openings 352 with each column defining twelve elongated slots. Each column also may provide surface area between the slots for adhering labeling information (e.g., connector designation). In one embodiment, the termination region 350 includes one or more termination panels, each of which defines openings 352 into which termination modules 500 may be inserted. The termination panels may be incrementally added to the swing frame bulkhead 335 as the number of subscribers increases.

Figure 9:
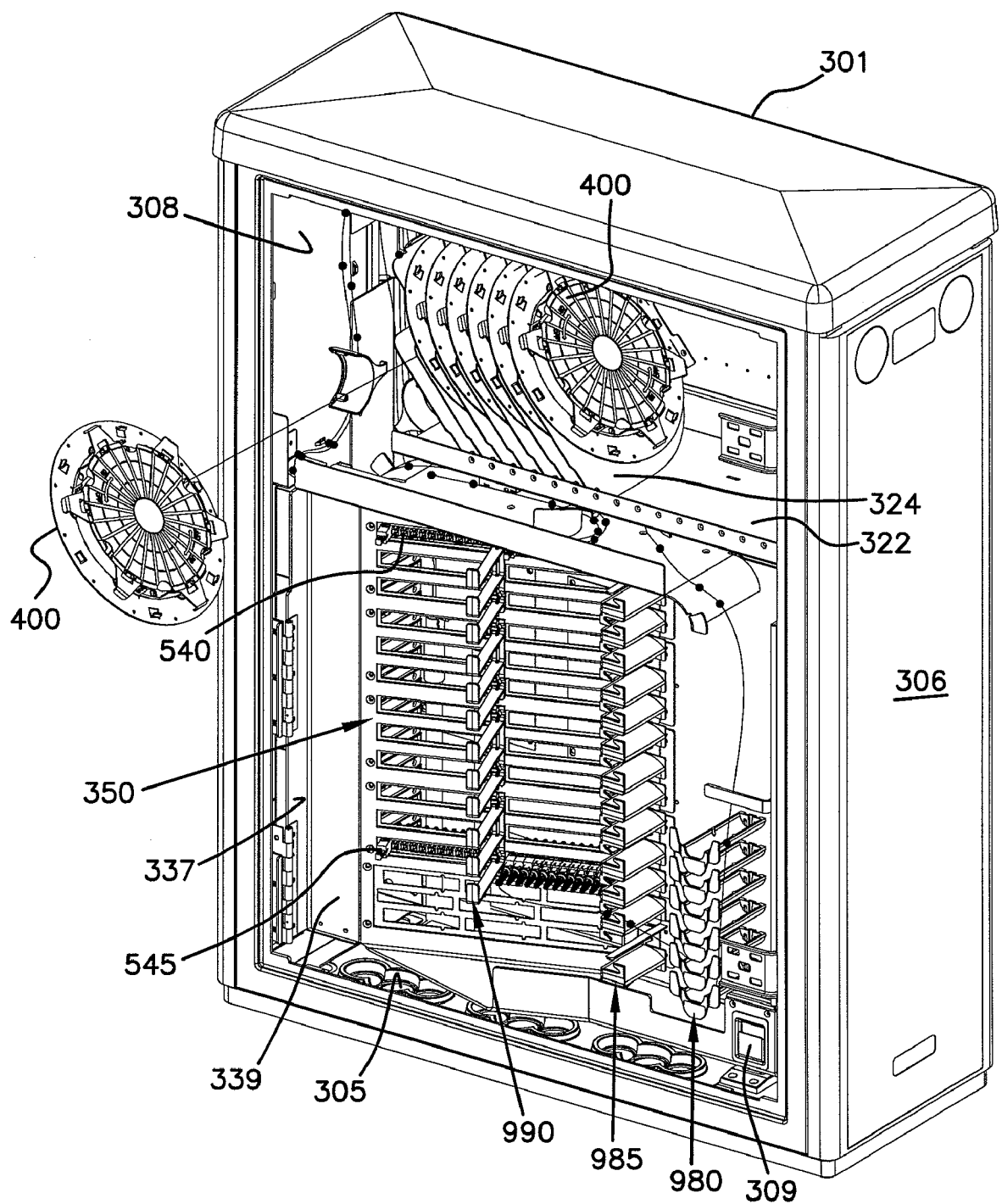
FIG. 9 is a front, perspective view of the FDH cabinet of FIG. 3 when the cabinet is partially loaded with splice trays (e.g., see the exploded splice tray) in accordance with the principles of the present disclosure.
Figure 10:
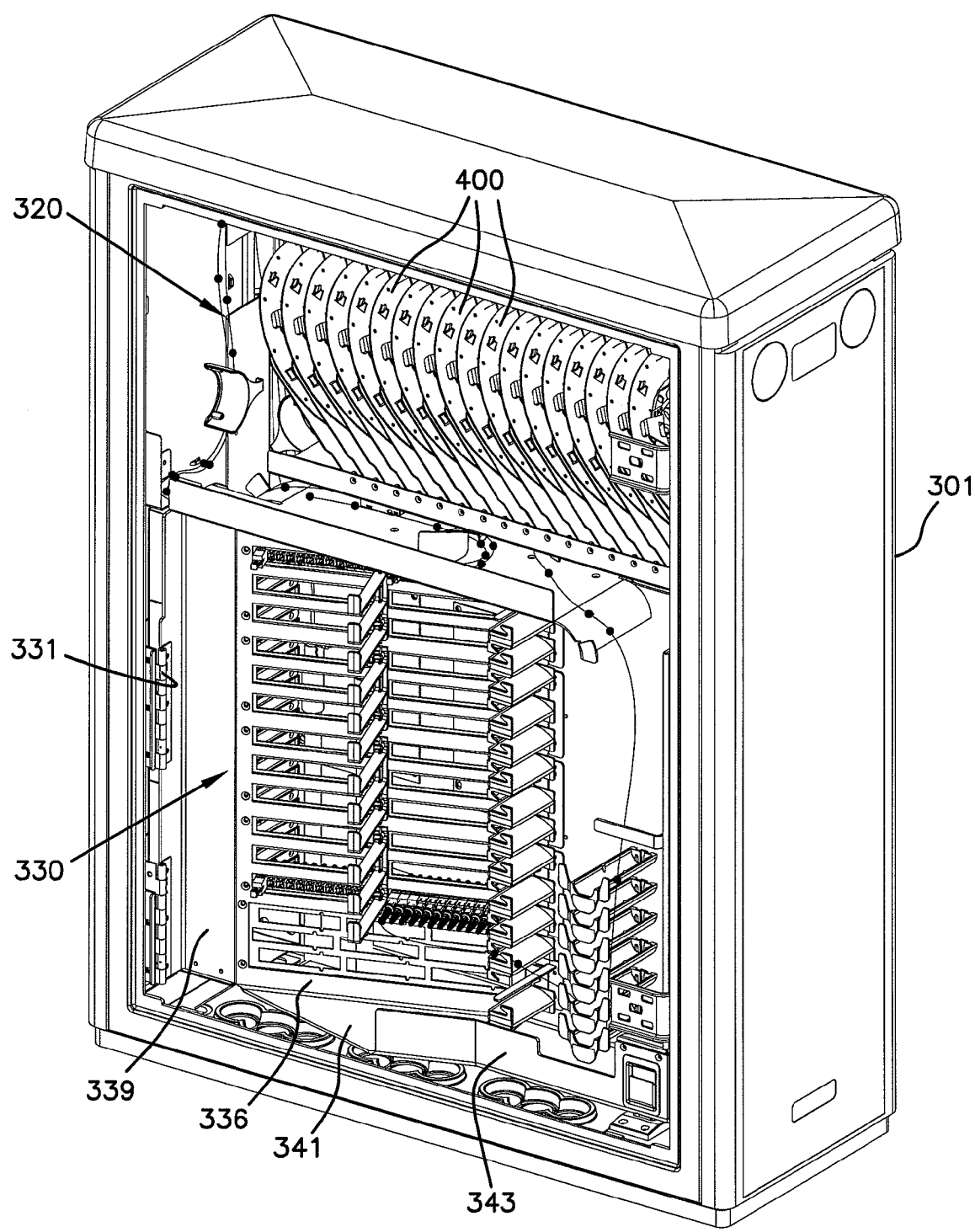
FIG. 10 is a front, perspective view of the FDH cabinet of FIG. 9 when the cabinet is fully loaded with splice trays in accordance with the principles of the present disclosure.

In general, each termination module 500 includes an adapter 540 (e.g., see FIG. 9). For example, multiple adapters 540 can be arranged into one or more rows. In the depicted embodiment, each opening 352 is configured to receive a single horizontal row of twelve adapters 540. In other embodiments, however, each opening 352 in the termination region 350 may be configured to receive greater or fewer numbers of adapters 540. In one embodiment, each termination module 500 includes a housing defining multiple adapters 540 as a single unit (not shown). In other embodiments, however, each termination module 500 includes only a single adapter 540.

First ends of the adapters 540 protrude from the front 332 of the swing frame bulkhead 335 (e.g., see FIG. 7) and second ends of the adapters 540 protrude from the back 334 of the bulkhead 335 (e.g., see FIG. 13). Each end of each adapter 540 is configured to receive a connectorized end of an optical fiber. For example, one end of an adapter 540 may receive a splitter pigtail 207 and the opposite end of the adapter 540 may receive a first pigtail 209, thereby coupling the feeder cable 201 to the distribution cable 205.

In some embodiments, the termination modules 500 are precabled at the factory to include a first pigtail 209 coupled to the second end of each adapter 540. Dust caps 545 may be provided on the first ends of the adapters 540 to protect the connectorized ends of the first pigtails 209 from dust, dirt, and other contaminants (e.g., see FIG. 9). The first pigtails 209 are mounted within the second ends of the adapter 540 and routed from the termination modules 500 to the splice region 320 of the FDH 300 where they may be spliced to fibers 204 of the distribution cable 205 (e.g., during installation of the FDH 300). In still other embodiments, the termination modules 500 are not precabled. In such embodiments, dust caps 545 may be provided on the second ends of the adapters 540 of the termination modules 500.

The storage region 360 also defines one or more openings 362 into which storage modules 600 may be mounted (e.g., see FIG. 7). The openings 362 can be arranged in any desired configuration within the storage region 360. In the example shown in FIG. 7, the storage region 360 defines nine openings 362 arranged in a rectangular pattern. Each opening 362 is configured to receive a storage module 600 configured to retain one or more connectorized optical fibers. In the embodiment depicted, the storage region 360 of the swing frame bulkhead 335 is located beneath the termination region 350. In other embodiments, however, the storage region 360 can be arranged above or adjacent to the termination region 350.

As shown in FIGS. 16-21, an example storage module 600 includes a body 610 that encloses and protects the connectorized ends of optical fibers. For example, the body 610 of each storage module 600 is configured to hold at least one fiber connector of a splitter pigtail 207 or pass-through cable 208. Typically, the body 610 is configured to hold about eight connectors. In some embodiments, the body 610 is arranged to retain the fiber connectors in a single row configuration (e.g., see FIG. 16). In other embodiments, however, the body 610 can be arranged to hold the connectors in a square pattern or in any other desired configuration.

Only a first side 602 of the body 610 of each storage module 600 defines openings 605 that are configured to receive the connectorized ends of the optical fibers (e.g., see FIG. 16). The opposite side 604 of the body 610 is configured to not receive optical fibers (e.g., see FIG. 17). However, side 604 of the body 610 may be configured to receive optical connector dust caps (not shown), thereby allowing the connectorized ends of the optical fibers to be received in the storage module body 610 with dust caps fitted about and protecting the connectorized ends.

The storage module body 610 may be configured to snap and/or latch onto a panel at the storage region 360. For example, in FIGS. 16-21, the storage module body 610 includes a latch 606 at a first end of the body 610 and a mounting tab 608 at a second end. In other embodiments, however, other mounting members and/or fasteners can be utilized to secure the storage module 600 to the storage region 360.

More information regarding the storage modules 600 can be found in U.S. application Ser. No. 10/610,325, filed on Jun. 30, 2003, entitled "Fiber Optic Connector Holder and Method"; U.S. application Ser. No. 10/613,764, filed on Jul. 2, 2003, entitled "Telecommunications Connection Cabinet;" and U.S. application Ser. No. 10/871,555, filed on Jun. 18, 2004, entitled "Multi-position Fiber Optic Connector Holder and Method," the disclosures of which are hereby incorporated herein by reference.

Figure 8:
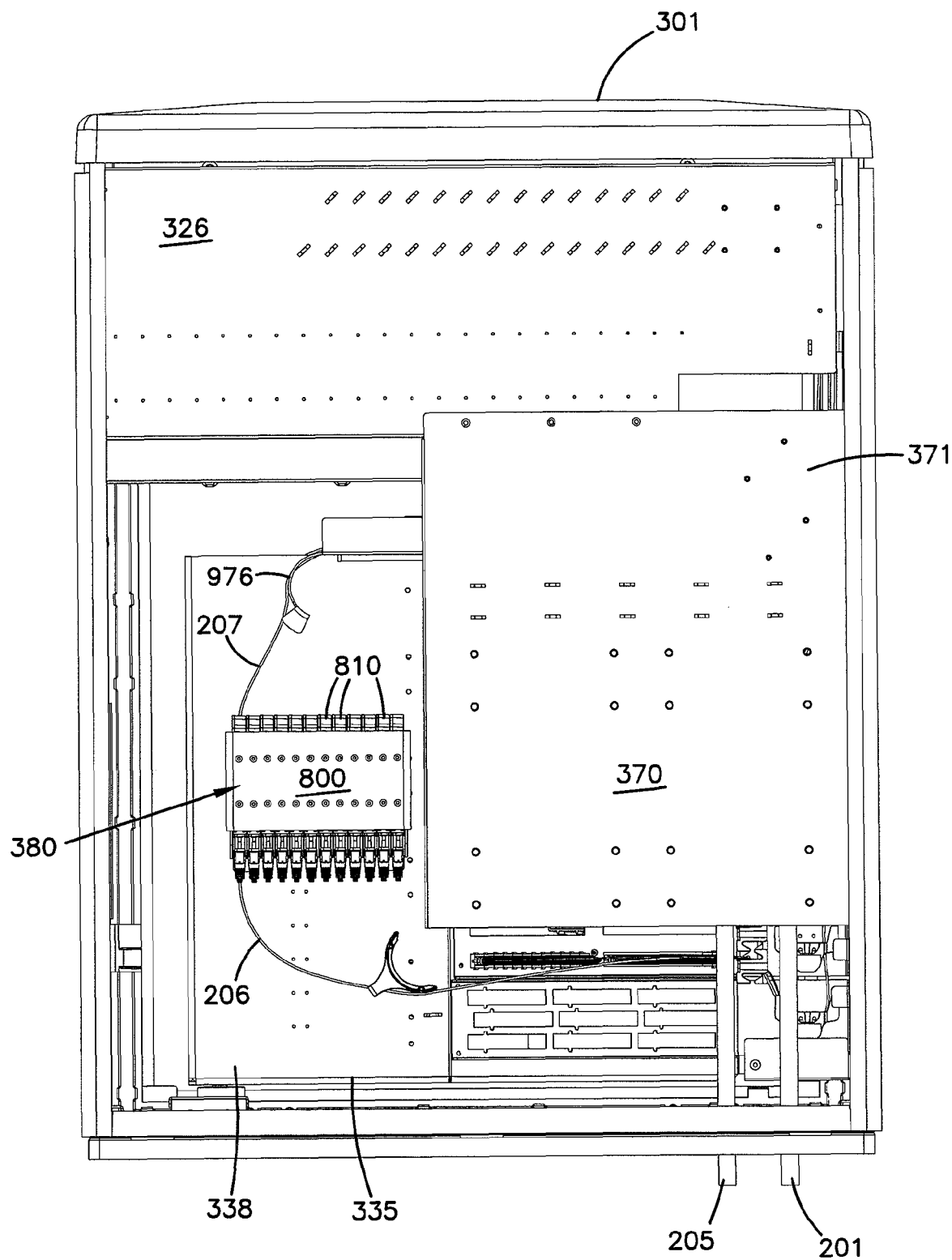
FIG. 8 is a rear view of the FDH cabinet of FIG. 3 with the rear wall removed so that the cabinet interior is visible from the rear of the cabinet in accordance with the principles of the present disclosure.

As shown in FIG. 8, the splitter module housing 800 is positioned on the back 334 of the swing frame bulkhead 335. The splitter module housing 800 is configured to protect, organize, and secure one or more splitter modules 810. The splitter module housing 800 may be constructed in various sizes to accommodate different numbers of splitter modules 810. The splitter module housing 800 is generally rectangular and defines one or more locations within an open interior sized to accept one or more optical splitter modules 810.

To accommodate the splitter modules 810, the module housing 800 includes structure for supporting/securing the splitter modules 810. In example embodiments, the splitter modules 810 are designed to snap into the splitter module housing 800. In one embodiment, the splitter modules 810 are loaded into the splitter module housing 800 from top to bottom. The module housing 800 is further configured to enable the splitter modules 810 to receive an input fiber, such as second pigtail fiber 206 of FIGS. 2A and 2B, at one end of the splitter module 810 and to output multiple fibers, such as splitter pigtails 207 of FIGS. 2A and 2B, from the opposing end of the splitter module 810.

Figure 22:
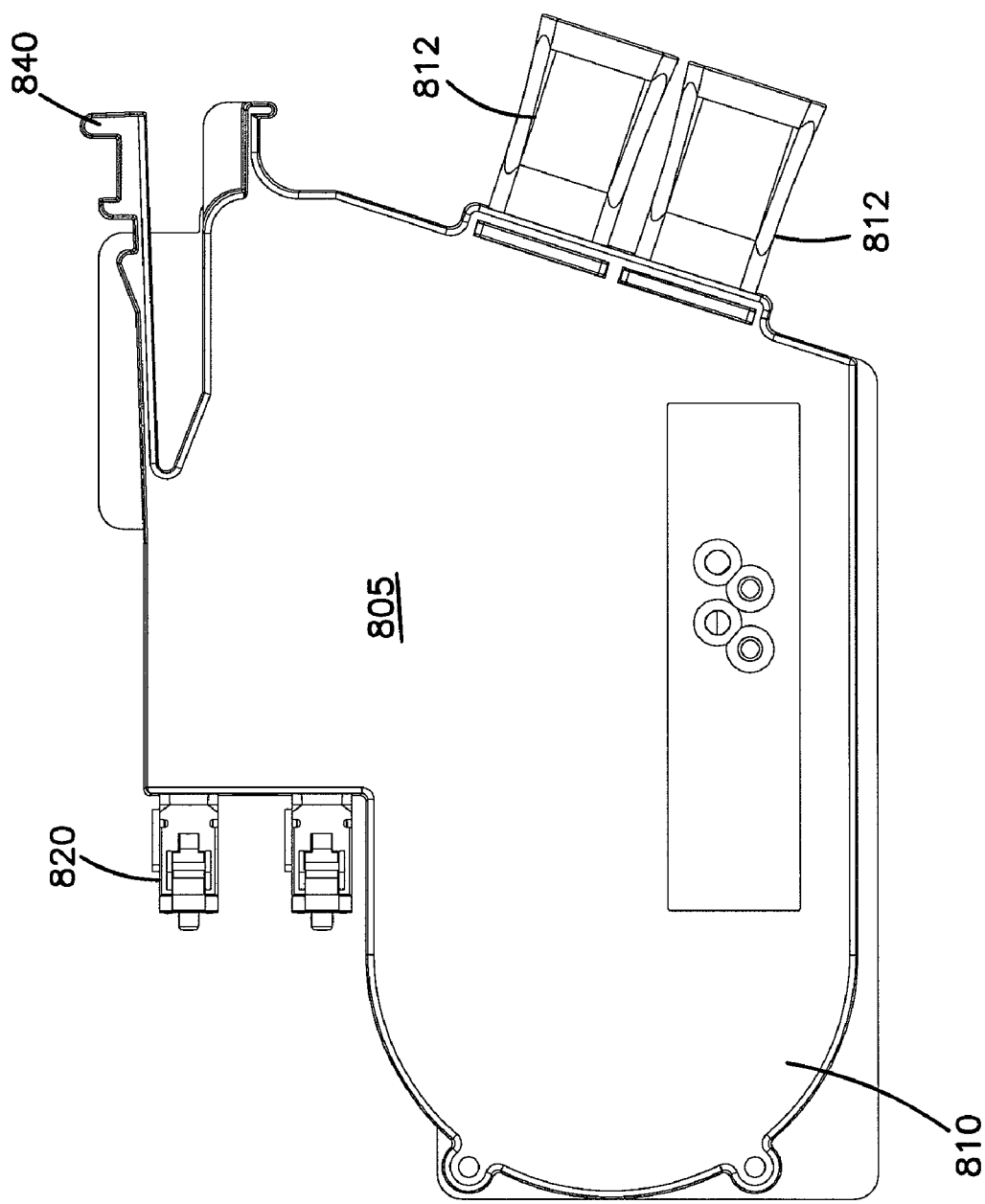
FIG. 22 is a side view of an example splitter module configured in accordance with the principles of the present disclosure.
Figure 23:
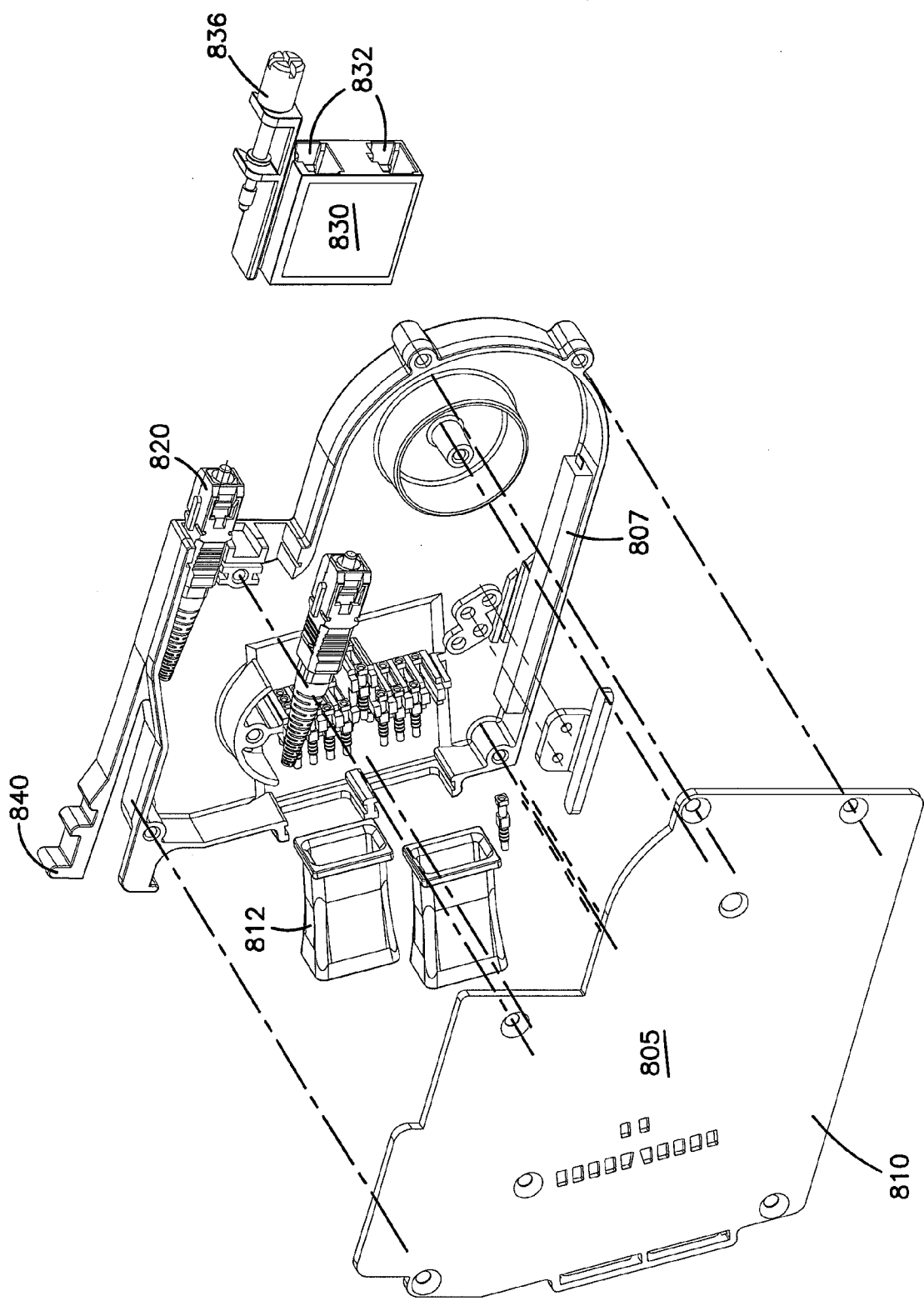
FIG. 23 is an exploded, perspective view of the splitter module of FIG. 22 configured in accordance with the principles of the present disclosure.
Figure 24:
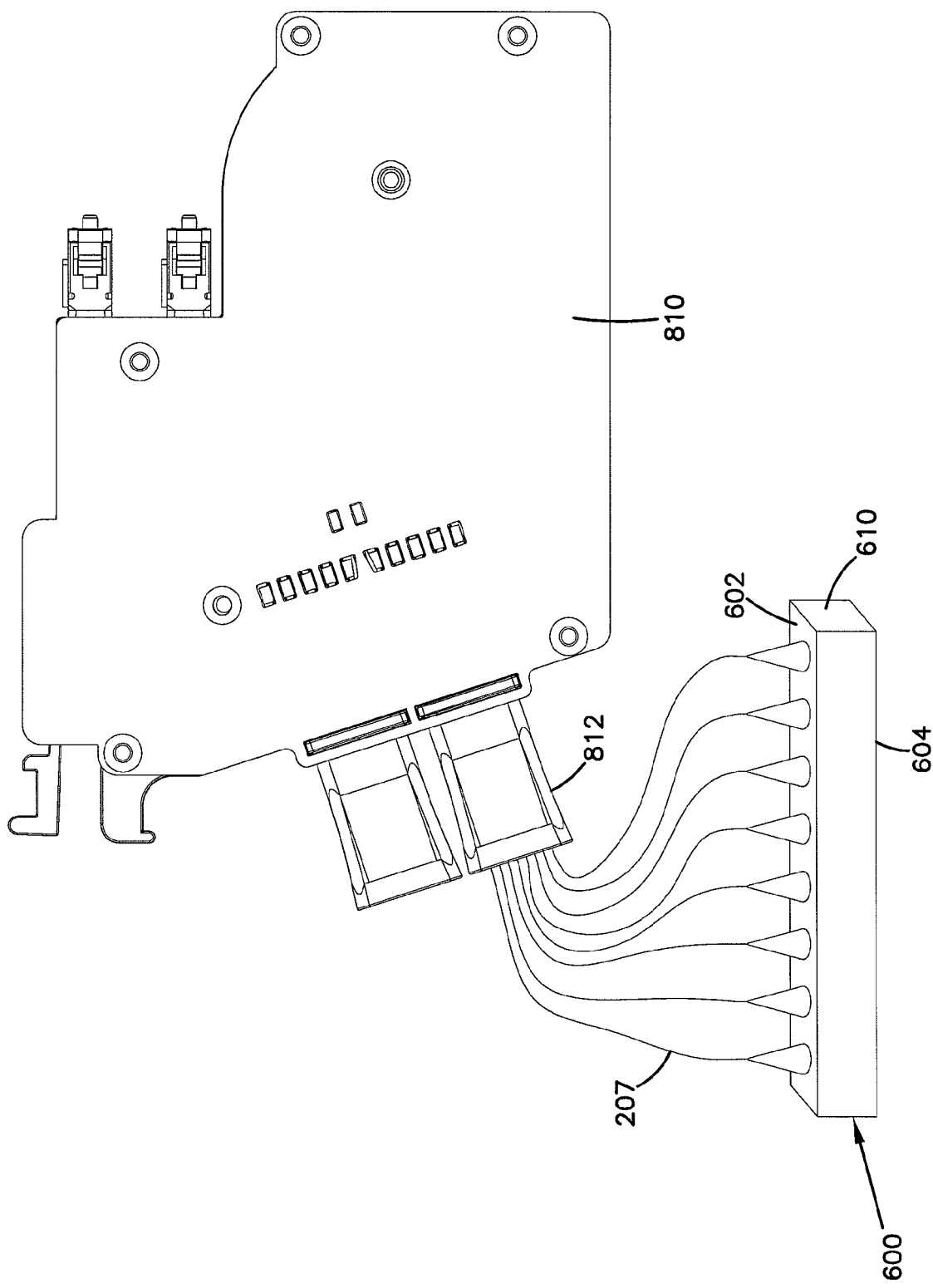
FIG. 24 is a side view of the splitter module of FIG. 22 having connectorized pigtails output from the splitter module and received at a storage module in accordance with the principles of the present disclosure.

Referring now to FIGS. 22-24, each splitter module 810 receives at least one second pigtail 206 (FIGS. 2A and 2B) and outputs at least two splitter pigtails 207 (FIGS. 2A and 2B). Signals propagated on the second pigtails 206 are split and fed into the splitter pigtails 207. Typically, each splitter module 810 receives between one and four input fibers 206 and outputs between two and sixteen output fibers 207 for every input fiber 206. In one example embodiment, two input fibers 206 enter a splitter module 810 and thirty-two pigtail fibers 207 exit the splitter module 810. In one embodiment, each of the splitter pigtails 207 has a common length.

One type of splitter module 810 that can be mounted in the splitter module housing 800 includes a splitter module having an integral connector. FIG. 16 is a left side view of such a splitter module 810. The splitter module 810 includes a housing 805 having at least one protective boot 812 protruding forwardly and at least one integral connector 820 protruding rearwardly. In the embodiment shown, two boots 812 protrude from the front and two integral connectors 820 protrude rearwardly from the splitter housing 805. In one example embodiment (not shown), each splitter module 810 has four integral connectors 820. In some embodiments, a handle 840 also protrudes from the front end of the splitter housing 805. FIG. 23 is an exploded view of the splitter module 810 of FIG. 22 showing the internal components of the splitter module 810 including the optical splitter 807.

In some embodiments, an adapter assembly 830 is secured to the splitter module housing 800 using a fastener 836. In one embodiment, adapter assemblies 830 are mounted at the bottom of the splitter module housing 800. Each adapter assembly 830 is configured to receive the connectors 820 of the splitter module 810 when the splitter module 810 is inserted into the splitter module housing 800. As shown, the adapter assembly 830 is further configured to receive an opposing connector associated with the second pigtail 206 (FIG. 2). In this way, the second pigtails 206 may be readily coupled to the splitter modules 810.

Further information regarding the splitter module 800 can be found in U.S. patent application Ser. No. 11/354,297, filed Feb. 13, 2006, entitled "Fiber Optic Splitter Module", which is hereby incorporated by reference.

Other embodiments of splitter modules 810 do not include integral connectors 820. In such embodiments, adapter assemblies 830 are not mounted at the splitter module housing 800 and the second pigtails 206 are not plugged directly into the splitter modules 810. Rather, input pigtails (not shown) may pass through the housings 805 of the splitter modules 810 to enter the splitter modules 810.

In other embodiments, the splitter module housing 800 may house other fiber components besides the splitter modules 810. For example, the splitter module housing 800 can house other fiber coupling components. In one embodiment, a pass-through adapter is coupled to the splitter module housing 800 for connecting a second pigtail 206 to a pass-through cable 208.

When the swing frame bulkhead 335 is arranged in the open position, as shown in FIG. 13, components in the rear portion 334 of the bulkhead 335 are accessible. For example, the splitter modules 810 are accessible when the bulkhead 335 is arranged in the open position. In addition, the first pigtails 209 and second pigtails 206 are accessible when the bulkhead 335 is swung out of the cabinet 301. In contrast, when the bulkhead 335 is arranged in the closed position (see FIG. 15), only components on the front portion 332 of the bulkhead (e.g., the connectorized ends of the splitter pigtails 207) are readily accessible.

In some embodiments, the splitter modules 810 and storage modules 600 may be incrementally added to the swing frame bulkhead 335. For example, FIG. 24 illustrates a splitter module 810 having multiple connectorized pigtails 207 exiting from a protective boot 812 on the splitter module 810. The connectorized ends of the pigtails 207 are typically stored in one or more storage modules 600 prior to installation on the bulkhead 335. In some embodiments, the connector of each pigtail 207 is secured in a storage module 600 before the splitter module 810 leaves the factory. Typically, the connectorized pigtails 207 of each splitter module 810 are routed to four storage modules 600, each holding eight connectors.

In some embodiments, the body 610 of each storage module 600 is designed to snap into one of the openings 362 defined in the storage region 360 of the swing frame bulkhead 335. In one embodiment, when a splitter module 810 is loaded into the splitter module housing 800 during installation, one or more corresponding storage modules 600 are loaded onto the storage region 360 of the bulkhead 335. For ease in viewing, only one splitter module 810 having eight splitter pigtails 207 routed to one storage module 600 is illustrated in FIG. 24.

During installation of the FDH 300, at least one optical fiber 204 of the distribution cable 205 is routed to a splice tray 400 arranged at the splice region 320 of the cabinet 301. In some embodiments, the fibers 204 of the distribution cable 205 may first be routed to fiber fanouts (not shown) within the cabinet 301 to break the cable 205 into the individual fibers 204 before being routed to the splice region 320. In one embodiment, such fanouts can be used to upjacket the fibers 204. In addition, at least one optical fiber 202 of the feeder cable 201 is routed to the splice region 320 of the cabinet. These fibers 202 also may be routed first to a fiber fanout. The fiber 202 of the feeder cable 201 may be spliced either to a fiber 204 of the distribution cable 205 or to a second pigtail 206.

As shown in FIGS. 25-28, cable management tools 900 may be provided throughout the cabinet 301 to facilitate routing of the optical fibers within the cabinet 301. For example, bend radius limiters 910 may be provided adjacent the splice region 320 (e.g., see FIG. 26) to facilitate routing the incoming optical fibers and the outgoing optical fibers to and from the splice region 320. Splicing optical fibers typically involves removing one or more splice trays 400 from the splice region 320, splicing the fibers and securing the splice within the splice trays 400, and replacing the splice trays 400 at the splice region 320.

Figure 26:
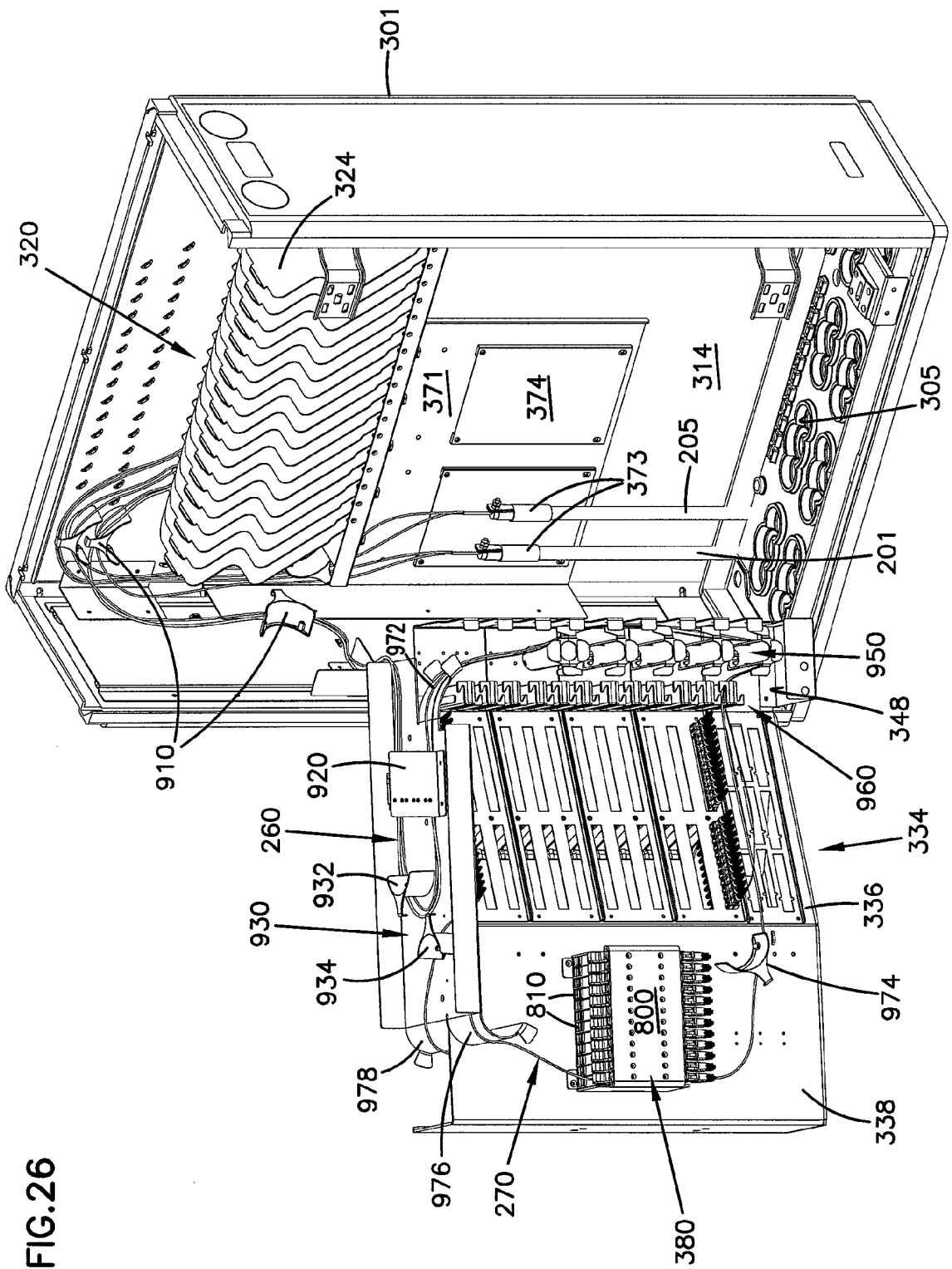
FIG. 26 is a front, perspective view of the FDH cabinet of FIG. 25 in which a feeder cable and a distribution cable have been routed into the cabinet and grounded in accordance with the principles of the present disclosure.

A first bundle 260 of fibers including first pigtail fibers 209 and second pigtail fibers 206 (FIGS. 2A and 2B) may be routed from the splice region 320 to the swing frame region 330 of the FDH 300 (e.g., see FIG. 26). In particular, the fibers of the first bundle 260 may be routed from the splice trays 400 to the back portion 334 of the termination region 350 of the swing frame bulkhead 335. Connectorized ends of the first pigtail fibers 209 are inserted into the termination modules 500 mounted at the termination region 350 (e.g., see FIG. 26). Connectorized ends of the second pigtail fibers 206 may be coupled to the splitter module housing 800 at the splitting region 380 on the back portion 334 of the bulkhead 335.

Cable management tools may be provided to facilitate this routing of the fibers of the first bundle 260. For example, the fibers of the first bundle 260 may be routed along bend radius limiters 910 to a top surface 342 of the bulkhead 335 adjacent a pivot axis of the swing frame. In the example shown in FIGS. 26 and 27, the top surface 342 of the bulkhead 335 forms a substantially rectangular tray. The top surface 342 also has a first end adjacent the connecting panel 339 of the bulkhead 335 and a second, opposite end adjacent the side panel 346 of the bulkhead 335. Flanges 345 may protrude from front and rear sides of the top surface 342 to aid in inhibiting the pigtails 209, 206 from spilling over the sides of the top surface 342.

Spools and/or bend radius limiters 930 may be provided on the top surface tray 342 of the swing frame bulkhead 335 to store fiber slack and/or to facilitate routing the fibers of the first bundle 260 along the top surface tray 342. In some embodiments, the cable management arrangements on the top surface 342 include a first spool 932 arranged at a distance away from the first end of the tray 342. In one embodiment, the first spool 932 is a half-spool. The fibers of the first bundle 260 are output from the splice region 320, routed over the first end of the tray 342 adjacent the pivot axis, wrapped around the first spool 932, and then routed back over the first end of the tray 342 and down the rear 334 of the bulkhead 335 (e.g., see FIG. 26). In another embodiment, additional spools can be provided at the tray 342.

In some embodiments, one or more fanouts 920 may be provided on the top surface 342 of the swing frame bulkhead 335. The pigtails 206, 209 may be routed to the fanouts 920 before being routed down the back 334 of the bulkhead 335. Each fanout 920 separates an incoming ribbon cable into multiple fibers. As the term is used herein, a 1:12 fanout is a fanout configured to receive a single cable ribbon containing the twelve fibers and to output twelve optical fibers. In another embodiment, 1:8 fanouts or 1:24 fanouts could be provided instead of the 1:12 fanouts.

The first and second pigtails 209, 206, respectively, are routed from the fanouts 920, over a bend radius limiter 972 at the first end of the top surface 342, and down the rear side of the connecting panel 339 (e.g., see FIG. 26) of the bulkhead 335. Routing tabs 940 may be provided on the back of the connecting panel 339 to define a channel along which the fibers of the first bundle 260 may be routed (e.g., see FIG. 27). A column 950 of one or more cable spools and/or bend radius limiters also may be provided to aid in managing slack in the first bundle fibers 260.

A trough 348 may extend rearwardly from the bulkhead 335 to aid further in managing the fibers of the first bundle 260 (e.g., see FIG. 26). The trough 348 may include a flange at a remote end of the trough 348 to inhibit the fibers of the first bundle 260 from spilling over the trough 348 and interfering with movement of the swing frame bulkhead 335. In the example shown in FIG. 26, the trough 348 extends only along a bottom of the connecting panel 339 of the bulkhead 335. In other embodiments, however, the trough 348 may extend along the entire back portion 334 of the bulkhead 335.

From the column 950 of cable spools, the first pigtails 209 of the first fiber bundle 260 are routed over fiber retention tabs 960 to termination modules 500 mounted at the termination region 350 of the bulkhead 335. In the example shown in FIG. 26, the fiber retention tabs 960 are arranged in a column adjacent the termination region 350. The fiber retention tabs 960 facilitate tracking of which pigtails 209 are routed to which termination modules 500. The fiber retention tabs 960 also may inhibit excess weight from crushing the fibers and/or bending the fibers beyond an acceptable bend radius.

In some embodiments, the first pigtails 209 may be pre-cabled at the factory from the splice trays 400 at the splice region 320 to the termination modules 500 at the termination region 350. Precabling the first pigtails 209 increases the efficiency with which the FDH 300 may be installed on site. Precabling the first pigtails 209 also decreases the chance of mistakes when installing the FDH 300. In other embodiments, however, the first pigtails 209 are not precabled.

The second pigtails 206 are routed from the column 950 of cable spools to the splitting region 380 of the swing frame 330. Typically, the second pigtails 206 are routed along a bottom of the termination region 350. In the example shown in FIG. 26, one or more bend radius limiters and/or partial spools 974 may be provided on the back 334 of the second panel 338 to aid in routing the second pigtails 206 to the splitter module housing 800. At the splitter module housing 800, the second pigtails 206 may be connected to splitter modules 810 mounted in the splitter module housing 800 (FIG. 26) or to pass-through cables 208 (FIG. 2A). In one embodiment (not shown), the second pigtails 206 connect to the pass-through cables 208 via adapters mounted in the splitter module housing 800.

In some embodiments, the second pigtails 206 may be precabled at the factory to extend from the splice trays 400 at the splice region 320 to the splitting region 380 of the cabinet 301. As noted above with respect to the first pigtails 209, precabling the second pigtails 206 may increase the efficiency with which the FDH 300 is installed and/or may decrease the chance of mistakes when installing the FDH 300. In other embodiments, however, the second pigtails 206 are not precabled.

A second bundle 270 of fibers including any splitter pigtails 207 and any pass-through cables 208 are routed from the splitter module housing 800 up the back 334 of the bulkhead 335, over the top surface tray 342 of the bulkhead 335, and down the front 332 of the bulkhead 335. In the depicted embodiment, the splitter pigtails 207 and pass-through cables 208 are routed over another bend radius limiter 976 on the back 334 of the bulkhead 335, onto the top surface tray 342, around another spool 934 mounted on the top surface tray 342, and down a bend radius limiter 978 on the front 332 of the bulkhead 335 (e.g., see FIG. 26). In one embodiment, the spool 934 is a partial-spool oriented to receive excess or slack length of second bundle fibers 270 routed from the back portion 334 of the bulkhead 335 to the front portion 332 of the bulkhead 335.

Figure 25:
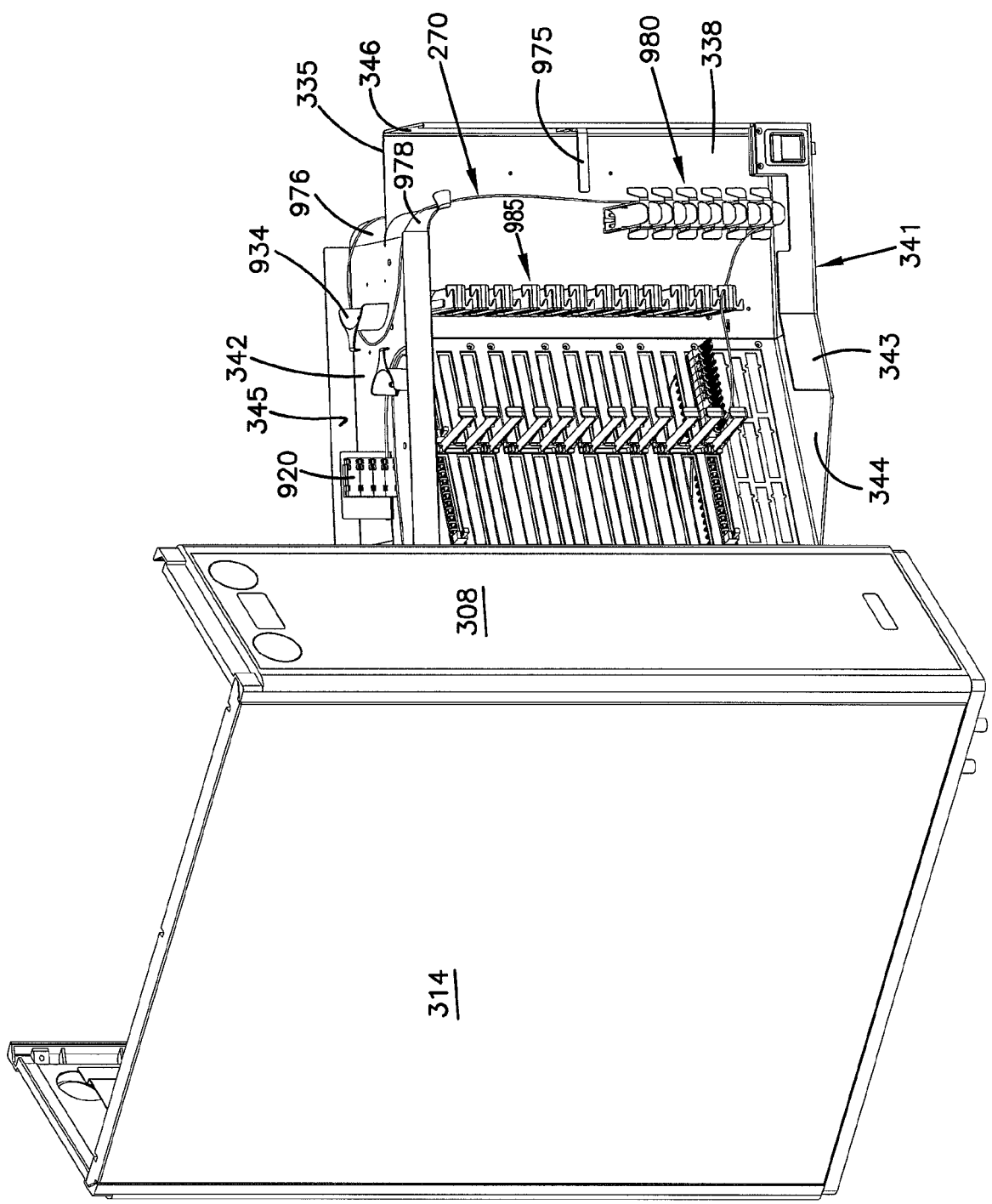
FIG. 25 is a rear, perspective view of an example FDH cabinet in which the top panel of the cabinet has been removed and a swing frame has been arranged in an open position in accordance with the principles of the present disclosure.
Figure 28:
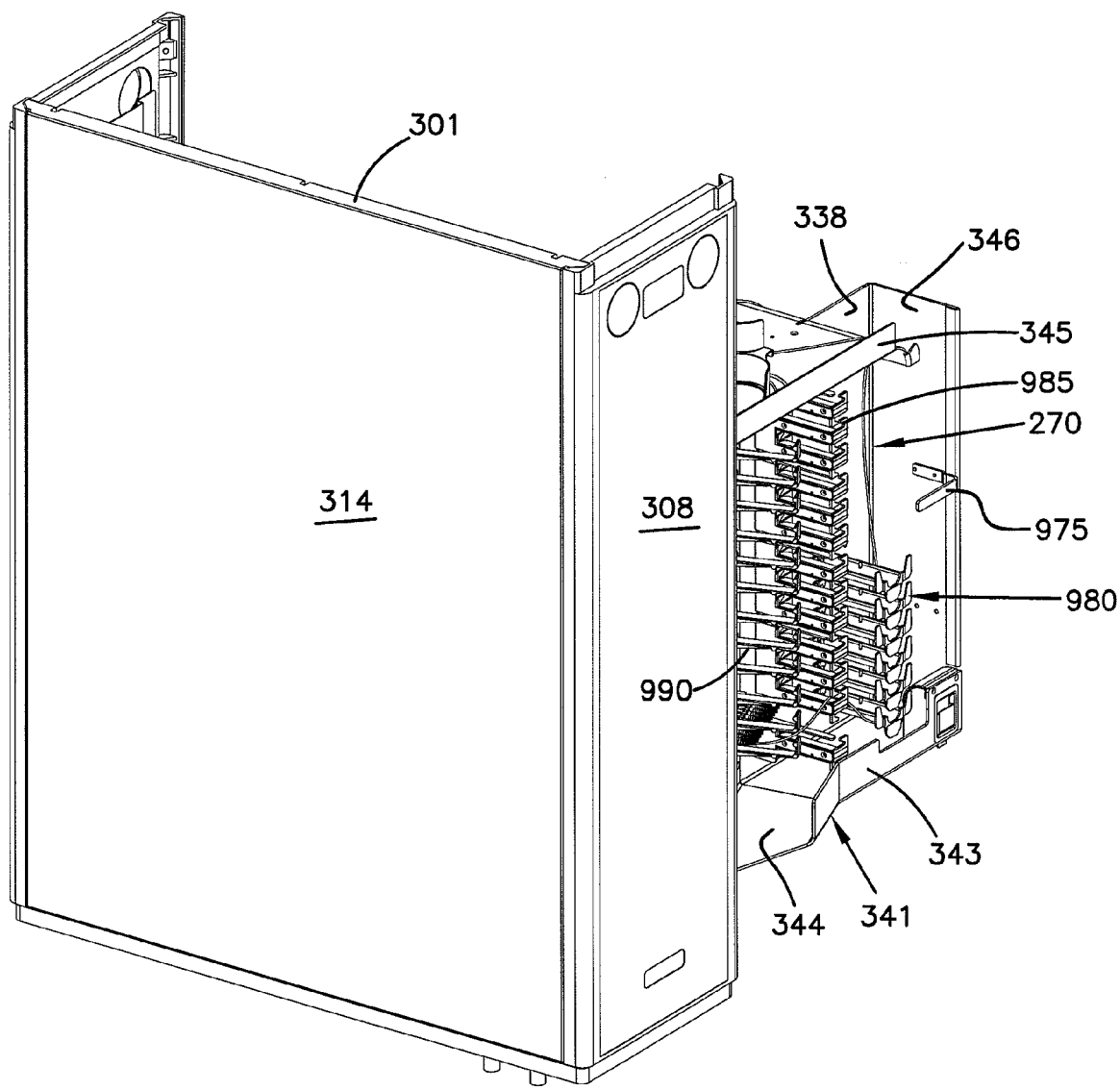
FIG. 28 is a rear, perspective view of the FDH cabinet of FIG. 27 in accordance with the principles of the present disclosure.

The front of the second panel 338 cooperates with the side panel 346 to form another channel along which the fibers of the second bundle 270 may be routed (e.g., see FIGS. 25 and 28). Tabs 975 extend from the side panel 346 to further define the channel (e.g., see FIG. 25). The channel leads the fibers of the second bundle 270 down to a tray 341 that projects forwardly from the bulkhead 335 (e.g., see FIGS. 25 and 28). In some embodiments, the tray 341 is defined by the bottom panel 344 of the swing frame 330 and a flange 343 that protrudes substantially perpendicular from the bottom panel 344 (e.g., see FIG. 25). The bottom panel 344 and flange 343 thereby form the tray 341 to retain slack or excess fiber routed from the cable management region of the second panel 338 and inhibit interference with opening and closing the swing frame 330. In one embodiment, an edge of the tray 341 may be angled to allow the swing frame bulkhead 335 to pivot open and closed without interference from the trough (e.g., see FIG. 28).

The front of the second panel 338 also includes at least one row of partial spools 980 and at least one row of fiber retention tabs 985. In one example embodiment, the partial spools 980 are oriented to enable fiber of the second bundle 270 routed down the channel to wrap at least partially around the spools 980 (e.g., see FIG. 25). The second bundle fiber 270 can travel from the partial spools 980 either along a trough, described herein, to the storage modules 600 or over the retention tabs 985 to the front of the termination modules 500. In some embodiments, the splitter pigtails 207 and pass-through cables 208 of the second bundle 270 also may be fed through support fingers 990 extending from the termination region 350 of the bulkhead 335 before connecting to the termination modules 500.

In some embodiments, the splitter pigtails 207 and pass-through cables 208 of the second bundle 270 may be pre-cabled at the factory. For example, when a splitter module 810 is installed in the FDH 300, corresponding splitter pigtails 207 may be routed up the back 334 of the bulkhead 335, over the top surface 342, and down the front 332 to the storage region 360. In one embodiment, at least one splitter module 810 is installed in the FDH 300 before the FDH 300 leaves the factory. Additional splitter modules 810 may be installed subsequent to shipping or installation of the FDH 300. In other embodiments, however, the splitter pigtails 207 and/or pass-through cables 208 are not precabled.

In use, when a splitter pigtail 207 retained in a storage module 600 should need to be connected to a subscriber distribution line, the connectorized end of the splitter pigtail 207 is removed from the storage module 600 and transferred to the appropriate adapter 540 on a termination module 500. During this transfer process, the splitter pigtail 207 may need to be rewound around a different partial spool 980 in order to reach the appropriate adapter. From the partial spool 980, the splitter pigtail 207 may be routed around a suitable retention tab 985 and support finger 990 to avoid excessive bending before reaching the adapter.

When all of the fibers 207, 208 of the second bundle 270 that were originally secured in the storage module 600 have been routed to subscriber termination modules 500, the empty storage module 600 may be removed to make room for a new storage module 600. Accordingly, the storage region 360 need not provide space to accommodate all splitter pigtails 207 that may be installed in the cabinet 301. Rather, only sufficient storage to accommodate newly installed splitter pigtails 207 before utilization is provided.

Figure 29:
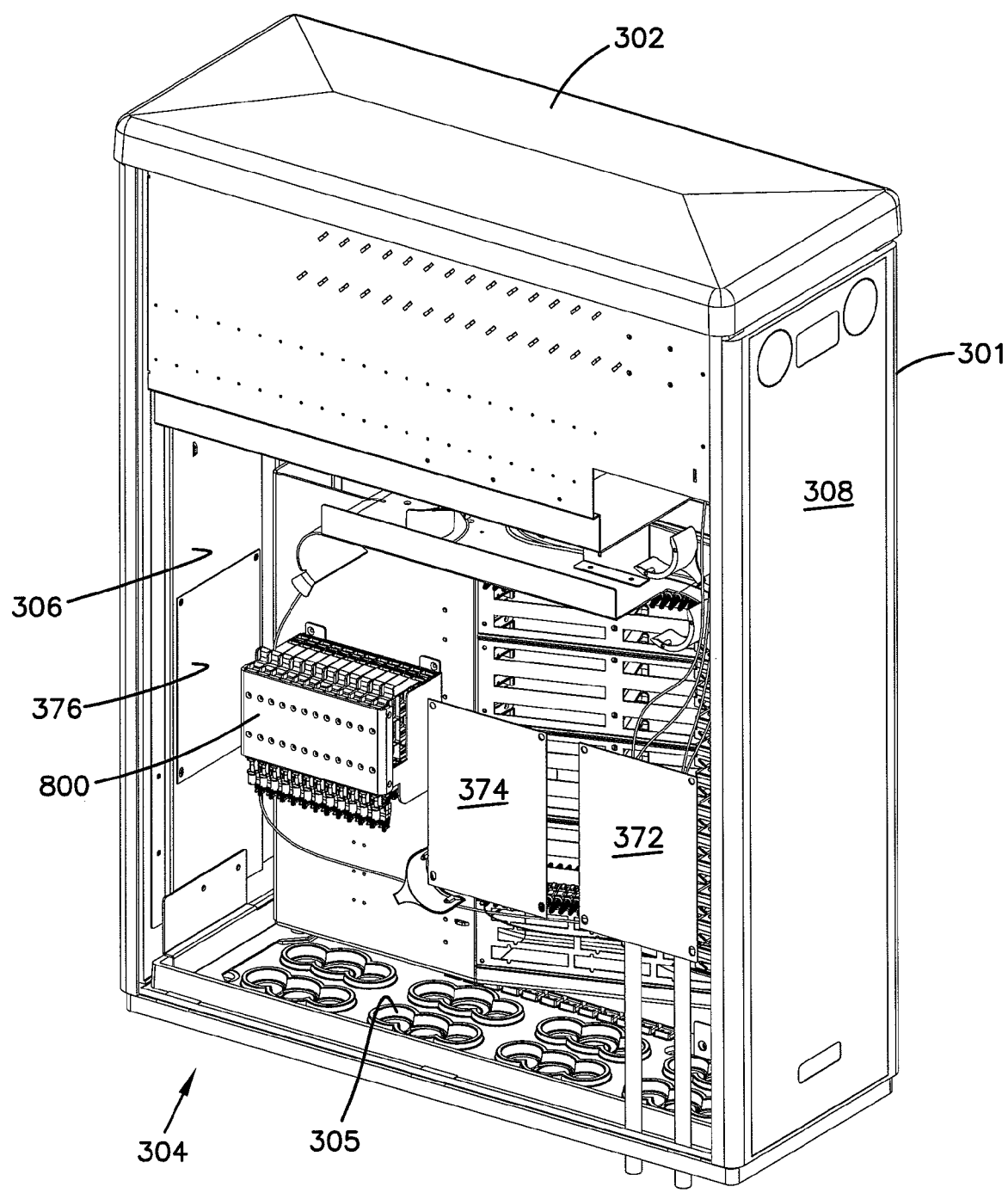
FIG. 29 is a rear, perspective view of an example FDH cabinet having the rear wall removed to facilitate viewing of the cable grounding plates mounted within the cabinet in accordance with the principles of the present disclosure.

Referring to FIGS. 8, 13, and 29, the grounding region 370 of the cabinet 301 may includes a base plate 371 to which grounding plates can be mounted. In one embodiment, the base plate 371 is mounted to one or more sides of the cabinet 301. In the example shown, the base plate 371 is mounted to the back wall 314 at a height H from the bottom 304 of the cabinet 301. In one embodiment, the base plate 371 is mounted at a height of about six inches from the bottom 304 of the cabinet 301. In another embodiment, the base plate 371 is about 218 mm (8.58 inches) from the bottom 304 of the cabinet 301.

Cable grounding plates 372 may be mounted to the base plate 371 or to another wall of the cabinet 301. For example, as shown in FIG. 13, first and second cable grounding plates 372, 374 may be mounted to the base plate 371. Additional cable grounding plates may be mounted to additional walls of the cabinet 301. For example, in FIG. 29, a third cable grounding plate 376 is mounted to the side wall 306 of the cabinet.

Each cable grounding plate 372 is configured to electrically ground one or more cables (201, 205) entering and exiting the cabinet 301. For example, the first cable grounding plate 372 mounted to the base plate 371 may electrically ground about six cables. In the example shown in FIG. 13, a feeder cable 201 and a distribution cable 205 are electrically coupled to the first cable grounding plate 372 using fasteners 373. For example, a metal cable clamp 373 may electrical couple metal shields within the cables 201, 205 to the first cable grounding plate.

In one embodiment, the grounding plates 372, 374, 376 provide electrical grounding for the cabinet 301. In another embodiment, the cabinet 301 is grounded separately from the fiber cables. In such an embodiment, the cable grounding plates 372, 374, 376 are electrically isolated from the base plate 371 and the rest of the cabinet 301.

In some embodiments, the cable grounding plates 372 may be added incrementally subsequent to installation of the cabinet 301. For example, the FDH 300 may be sold with a single cable grounding plate 372 configured to service a predetermined number of fiber cables. When additional fiber cables are subsequently routed to the FDH 300, additional cable grounding plates may be added to provide electrical grounding for the additional fiber cables. In other embodiments, however, all of the cable grounding plates may be added prior to installation.

It will be appreciated that the fiber distribution hub 300 can be manufactured in a variety of different sizes. However, to promote manufacturing efficiency, it is preferred for the splitters to be manufactured with pigtails having uniform lengths. To accommodate the different sizes of fiber distribution hubs, the pigtails are preferably designed long enough to work in the largest fiber distribution hub expected to be used. For the smaller distribution hubs, excess length provided in the pigtails can be taken up by wrapping the excess length around at fiber storage areas. For example, the excess length can be wrapped around spools 932, 934 (see FIG. 13) provided at the top of the swing frame.

The above specification, examples and data provide a complete description of the manufacture and use of the invention. Since many embodiments of the invention can be made without departing from the spirit and scope of the invention, the invention resides in the claims hereinafter appended.

We claim:

1. A fiber distribution hub adapted to provide an interface between an incoming fiber and a plurality of outgoing fibers, the fiber distribution hub comprising:
    a cabinet defining an access opening providing access to an interior of the cabinet, the cabinet including a door covering the access opening when the door is in a closed position;
    a swing frame extending from a first end to a second end, the first end of the swing frame being pivotally coupled to the cabinet to enable the swing frame to move between closed and open positions, the swing frame including a bulkhead having a first side facing the access opening of the cabinet when the swing frame is in the closed position and a second side facing away from the access opening when the swing frame is in the closed position;
    a termination region located on the bulkhead, the termination region including a plurality of adapters that extend between the first and second sides of the bulkhead; and
    a splitter region located on the second side of the bulkhead such that the bulkhead extends between the splitter region and the access opening when the swing frame is in the closed position, the splitter region being configured to receive at least one splitter module that is configured to split optical signals from at least a first splitter input pigtail onto a plurality of splitter output pigtails, the splitter output pigtails being routed from the second side of the bulkhead to the first side of the bulkhead.

2. The fiber distribution hub of claim 1, wherein connectorized ends of at least some of the splitter output pigtails are plugged into the adapters of the termination region at the first side of the bulkhead.

3. The fiber distribution hub of claim 2, further comprising a first cable management region located on the first side of the bulkhead at the second end of the swing frame, the first cable management region including a plurality of bend radius limiters through which the splitter output pigtails are routed when plugged into the adapters.

4. The fiber distribution hub of claim 1, wherein connectorized ends of at least some of the splitter output pigtails are plugged into connector holders at a storage region, which is located on the swing frame bulkhead.

5. The fiber distribution hub of claim 4, wherein the storage region is located beneath the termination region on the bulkhead.

6. The fiber distribution hub of claim 1, wherein the splitter region is located at the second end of the swing frame and the termination region is located between the splitter region and the first end of the swing frame.

7. The fiber distribution hub of claim 1, further comprising a second cable management region located on the second side of the bulkhead at the first end of the swing frame, the second cable management region including a plurality of bend radius limiters.

8. The fiber distribution hub of claim 7, wherein the first splitter input pigtail is routed through the second cable management region, across a bottom of the termination region, to the splitter region on the second side of the bulkhead.

9. The fiber distribution hub of claim 1, further comprising:
    a feeder cable entering the cabinet, the feeder cable including at least a first feeder cable fiber that is optically coupled to the first splitter input pigtail;
    a subscriber cable entering the cabinet, the subscriber cable including a plurality of subscriber cable fibers that optically couple to termination pigtails, which plug into the adapters of the termination region at the second side of the swing frame bulkhead.

10. The fiber distribution hub of claim 9, further comprising a management tray positioned above the swing frame bulkhead.

11. The fiber distribution hub of claim 10, wherein the first splitter input pigtail is routed onto the management tray of the swing frame at the first end of the swing frame, around at least a first bend radius limiter, and down the second side of the swing frame bulkhead, to the termination region.

12. The fiber distribution hub of claim 11, wherein the termination pigtails are routed onto the management tray of the swing frame at the first end of the swing frame, around at least the first bend radius limiter, and through the second cable management region at the second side of the swing frame.

13. The fiber distribution hub of claim 12, wherein the termination pigtails are routed through the second cable management region to the adapters of the termination region at the second side of the bulkhead.

14. The fiber distribution hub of claim 10, wherein each splitter output pigtail is routed from the splitter region, onto the management tray at the second end of the swing frame, around at least one bend radius limiter, and down the first side of the swing frame bulkhead.

15. The fiber distribution hub of claim 14, wherein the management tray includes a rear bend radius limiter that facilitate transitioning the splitter output pigtails from the splitter region to the management tray.

16. The fiber distribution hub of claim 14, wherein the management tray includes a front bend radius limiter that facilitate transitioning the splitter output pigtails from the management tray to the front of the swing frame bulkhead.

17. The fiber distribution hub of claim 9, further comprising a splice region located within the cabinet, the splice region configured to receive at least one splice tray; wherein the first feeder cable fiber is spliced to the first splitter input pigtail at the splice region and wherein the subscriber cable fibers are spliced to the termination pigtails at the splice region.

18. The fiber distribution hub of claim 1, wherein a pass-through adapter is mounted at the splitter region.

19. The fiber distribution hub of claim 1, wherein the swing frame includes a trough extending outwardly beneath the second cable management region.

20. A fiber distribution hub adapted to provide an interface between an incoming fiber and a plurality of outgoing fibers, the fiber distribution hub comprising:
    a cabinet defining an access opening providing access to an interior of the cabinet, the cabinet including a door covering the access opening when the door is in a closed position;
    a swing frame extending from a first end to a second end, the first end of the swing frame being pivotally coupled to the cabinet to enable the swing frame to move between closed and open positions, the swing frame including a bulkhead having a first side facing the access opening of the cabinet when the swing frame is in the closed position and a second side facing away from the access opening when the swing frame is in the closed position;

a termination region located on the bulkhead, the termination region including a plurality of adapters that extend between the first and second sides of the bulkhead; and a splitter region located on the second side of the bulkhead, the splitter region being configured to receive at least one splitter module that is configured to split optical signals from at least a first splitter input pigtail onto a plurality of splitter output pigtails, the splitter output pigtails being routed from the second side of the bulkhead to the first side of the bulkhead;

wherein the splitter module mounted at the splitter region is oriented so that the splitter output pigtails extend vertically upwardly toward a top of the swing frame bulkhead.

* * * * *